US010558817B2

(12) United States Patent
Goel et al.

(10) Patent No.: US 10,558,817 B2
(45) Date of Patent: Feb. 11, 2020

(54) ESTABLISHING A LINK BETWEEN IDENTIFIERS WITHOUT DISCLOSING SPECIFIC IDENTIFYING INFORMATION

(71) Applicant: Google Inc., Mountain View, CA (US)

(72) Inventors: Vinay Goel, Mountain View, CA (US); Philip Mcdonnell, Belmont, CA (US); Sachin Kulkarni, Sunnyvale, CA (US); Anshul Gupta, San Francisco, CA (US); Shobhit Saxena, Sunnyvale, CA (US); Patrick McDonald, Mountain View, CA (US); Thai Duong, Sunnyvale, CA (US); Mihaela Ion, New York, NY (US); Benjamin Kreuter, Jersey City, NJ (US); Sarvar Patel, Montville, NJ (US); Karn Seth, Jackson Heights, NY (US)

(73) Assignee: Foley & Lardner LLP, Mountain View, CA (US)

( * ) Notice: Subject to any disclaimer, the term of this patent is extended or adjusted under 35 U.S.C. 154(b) by 312 days.

(21) Appl. No.: 15/419,726

(22) Filed: Jan. 30, 2017

(65) Prior Publication Data
US 2018/0218168 A1 Aug. 2, 2018

(51) Int. Cl.
*H04L 29/06* (2006.01)
*G06F 21/62* (2013.01)
(Continued)

(52) U.S. Cl.
CPC .......... *G06F 21/6227* (2013.01); *G06F 16/22* (2019.01); *G06F 21/6245* (2013.01); *H04L 9/0643* (2013.01)

(58) Field of Classification Search
None
See application file for complete search history.

(56) References Cited

U.S. PATENT DOCUMENTS 7,610,627 B1 * 10/2009 McKenna .............. G06F 21/62
713/168
8,706,739 B1 * 4/2014 Song ................... G06F 16/9535
707/748
(Continued)

FOREIGN PATENT DOCUMENTS

CN 104636677 5/2015

OTHER PUBLICATIONS

International Search Report and Written Opinion for PCT/US2017/066516 dated Feb. 21, 2018.

*Primary Examiner* — Shin-Hon (Eric) Chen
(74) *Attorney, Agent, or Firm* — Foley & Lardner LLP

(57) ABSTRACT

A method for linking user identifiers. The method includes receiving, by a linking server and from a company server, a first data structure comprising entries. Each entry comprising a user tag, a first hashed user information, and a second hashed user information. The method includes receiving, by a linking server and from a partner server, a second data structure comprising entries. Each entry comprising a bridge tag, a first hashed bridge information, and a second hashed bridge information. The method includes retrieving, by the linking server and from the first data structure, a first entry of the entries and retrieving, by the linking server and from the second data structure, a first entry of the entries. The method includes linking the user tag of the first entry of the first data structure to the bridge tag of the first entry of the second data structure to generate a first linkage.

20 Claims, 7 Drawing Sheets

(51) Int. Cl.
*G06F 16/22* (2019.01)
*H04L 9/06* (2006.01)

(56) References Cited

U.S. PATENT DOCUMENTS

| | | | | |
|---|---|---|---|---|
| 2012/0110071 | A1* | 5/2012 | Zhou | G06Q 10/10 709/204 |
| 2014/0122268 | A1* | 5/2014 | Argue | G06Q 20/20 705/18 |
| 2014/0222561 | A1* | 8/2014 | Mathur | G06Q 30/0255 705/14.53 |
| 2014/0250111 | A1* | 9/2014 | Morton | G06F 17/30303 707/723 |
| 2015/0019547 | A1* | 1/2015 | Thalapathy | G06F 17/30699 707/732 |
| 2015/0026181 | A1* | 1/2015 | Milton | G06Q 30/0269 707/737 |
| 2015/0082387 | A1* | 3/2015 | Ciancio-Bunch | H04L 51/063 726/4 |
| 2015/0149208 | A1 | 5/2015 | Lynch et al. | |
| 2015/0264057 | A1* | 9/2015 | Mevec | G06F 11/1448 726/22 |
| 2017/0373853 | A1* | 12/2017 | Soman | H04L 9/3239 |
| 2018/0212931 | A1* | 7/2018 | Zhou | H04L 63/0428 |

* cited by examiner

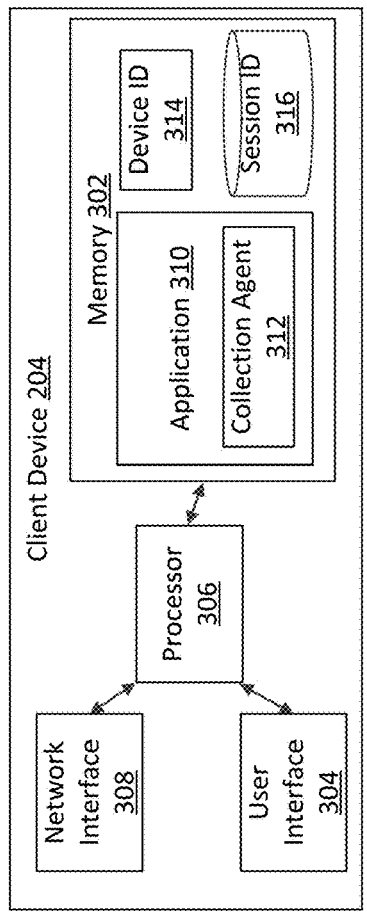
Fig. 3A
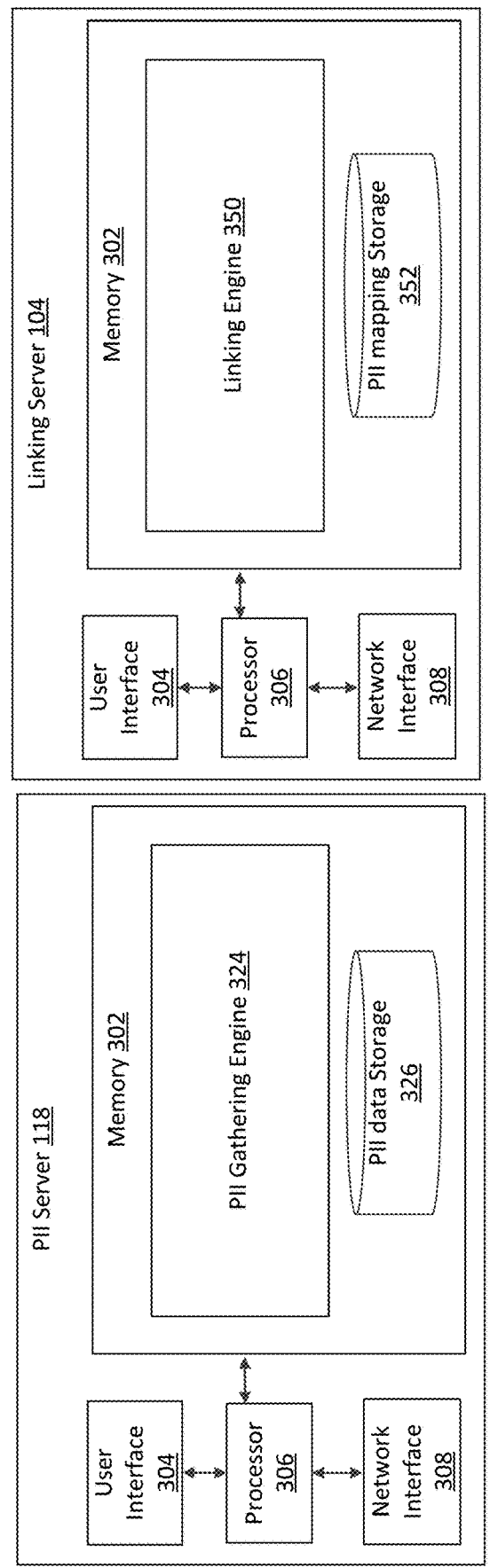
Fig. 3C
Fig. 3B

ESTABLISHING A LINK BETWEEN IDENTIFIERS WITHOUT DISCLOSING SPECIFIC IDENTIFYING INFORMATION

BACKGROUND

Businesses that provide internet-related services and products study consumer behavior by capturing, organizing, and analyzing web data gathered from client computing devices. Web data may include user identifiable information that businesses store in protected databases.

SUMMARY

Aspects of the present disclosure relate generally to mapping of specific identifying information between businesses to improve the delivery of internet-related services and products to customers.

One implementation disclosed herein is a method for linking user identifiers. The method includes receiving, by a linking server and from a company server, a first data structure comprising entries. Each entry includes a user tag, a first hashed user information, and a second hashed user information; each entry associated with a corresponding client device. The method includes receiving, by a linking server and from a partner server, a second data structure including entries, each entry including a bridge tag, a first hashed bridge information, and a second hashed bridge information; each entry associated with a corresponding client device. The method also includes retrieving, by the linking server and from the first data structure, a first entry of the entries of the first data structure. The method includes retrieving, by the linking server and from the second data structure, a first entry of the entries of the second data structure. The method includes comparing, by the linking server, the first hashed user information of the first entry of the first data structure to the first hashed bridge information of the first entry of the second data structure. The method includes linking, by the linking server and in response to determining a match, the user tag of the first entry of the first data structure to the bridge tag of the first entry of the second data structure to generate a first linkage.

In some implementations, comparing includes parsing, by the linking server, the first hashed user information of the first entry of the first data structure into a first set of characters. In some implementations, the method includes parsing, by the linking server, the first hashed bridge information of the first entry of the second data structure into a second set of characters. In some implementations, the method includes comparing, by the linking server, a character from the first set of characters to a character from the second set of characters.

In some implementations, the method includes providing, by the linking server and to the company server, the first linkage. In some implementations, the linking server exists inside a clean room environment and the company server exists outside the clean room environment and the partner server exists outside the clean room environment.

In some implementations, the method includes removing, by the linking server, the first entry of the first data structure and the first entry of the second data structure. In some implementations, the method includes retrieving, by the linking server and from the first data structure, a second entry of the entries, retrieving, by the linking server and from the second data structure, a second entry of the entries; and comparing, by the linking server, the first hashed user information of the second entry of the first data structure to the first hashed bridge information of the second entry of the second data structure.

In some implementations, the method includes determining, by the linking server, a mismatch between the first hashed user information of the second entry of the first data structure to the first hashed bridge information of the second entry of the second data structure, and comparing, by the linking server, the second hashed user information of the second entry of the first data structure to the second hashed bridge information of the second entry of the second data structure.

In some implementations, the method includes determining, by the linking server, a mismatch between the first hashed user information of the first entry of the first data structure to the first hashed bridge information of the first entry of the second data structure. In some implementations, the method includes retrieving, by the linking server and from the second data structure, a second entry of the entries. In some implementations, the method includes comparing, by the linking server, the first hashed user information of the first entry of the first data structure to the first hashed bridge information of the second entry of the second data structure.

In some implementations, the method includes comparing, by the linking server, the second hashed user information of the first entry of the first data structure to the second hashed bridge information of the second entry of the second data structure. In some implementations, the method includes linking, by the linking server and in response to determining a match, the user tag of the first entry of the first data structure to the bridge tag of the first entry of the second data structure to generate a first linkage. In some implementations, the method includes providing, by the linking server and to the company server, the first linkage.

In another aspect, the present disclosure is directed to a system for linking user identifiers. The system includes a linking server configured to receive, from a company server, a first data structure comprising entries. Each entry including a user tag, a first hashed user information, and a second hashed user information. Each entry associated with a user of a client device.

In some implementations, the system includes a linking server configured to receive, from a partner server, a second data structure comprising entries. Each entry comprising a bridge tag, a first hashed bridge information, and a second hashed bridge information. Each entry associated with a user of a client device.

In some implementations, the system includes a linking server configured to retrieve, from the first data structure, a first entry of the entries of the first data structure. In some implementations, the system includes a linking server configured to retrieve, from the second data structure, a first entry of the entries of the second data structure. In some implementations, the system includes a linking server configured to compare, the first hashed user information of the first entry of the first data structure to the first hashed bridge information of the first entry of the second data structure. In some implementations, the system includes a linking server configured to link, in response to determining a match, the user tag of the first entry of the first data structure to the bridge tag of the first entry of the second data structure to generate a first linkage.

In some implementations, the system includes a linking server configured to parse the first hashed user information of the first entry of the first data structure into a first set of characters. In some implementations, the system includes a linking server configured to parse the first hashed bridge information of the first entry of the second data structure into a second set of characters. In some implementations, the system includes a linking server configured to compare a character from the first set of characters to a character from the second set of characters.

In some implementations, the system includes a linking server configured to provide, to the company server, the first linkage. In some implementations, the linking server exists inside a clean room environment. In some implementations, the linking server exists outside the clean room environment. In some implementations, the partner server exists outside the clean room environment.

In some implementations, the system includes a linking server configured to remove the first entry of the first data structure and the first entry of the second data structure. In some implementations, the system includes a linking server configured to retrieve, from the first data structure, a second entry of the entries. In some implementations, the system includes a linking server configured to retrieve, from the second data structure, a second entry of the entries. In some implementations, the system includes a linking server configured to compare the first hashed user information of the second entry of the first data structure to the first hashed bridge information of the second entry of the second data structure.

In some implementations, the system includes a linking server configured to determine a mismatch between the first hashed user information of the second entry of the first data structure to the first hashed bridge information of the second entry of the second data structure. In some implementations, the system includes a linking server configured to compare the second hashed user information of the second entry of the first data structure to the second hashed bridge information of the second entry of the second data structure. In some implementations, the system includes a linking server configured to determine a mismatch between the first hashed user information of the first entry of the first data structure to the first hashed bridge information of the first entry of the second data structure. In some implementations, the system includes a linking server configured to retrieve, from the second data structure, a second entry of the entries of the second data structure. In some implementations, the system includes a linking server configured to compare the first hashed user information of the first entry of the first data structure to the first hashed bridge information of the second entry of the second data structure.

In some implementations, the system includes a linking server configured to compare the second hashed user information of the first entry of the first data structure to the second hashed bridge information of the second entry of the second data structure. In some implementations, the system includes a linking server configured to link, in response to determining a match, the user tag of the first entry of the first data structure to the bridge tag of the first entry of the second data structure to generate a first linkage. In some implementations, the system includes a linking server configured to provide, to the company server, the first linkage.

In another aspect, the present disclosure is directed to a method for linking user identifiers. The method includes receiving, by a linking server and from a company server, a first data structure comprising entries. Each entry comprising a user tag, a first hashed user information, and a second hashed user information, Each entry associated with a user of a client device.

In some implementations, the method includes receiving, by a linking server and from a partner server, a second data structure comprising entries. Each entry comprising a bridge tag, a first hashed bridge information, and a second hashed bridge information. Each entry associated with a user of a client device.

In some implementations, the method includes generating, by the linking server, a third data structure based on the first data structure and the second data structure. In some implementations, the method includes providing, by the linking server and to the company server, the third data structure.

In some implementations, the first data structure includes a first email address associated with a client device and a first phone number associated with the client device. In some implementations, the second data structure includes a second email address associated with the client device and a second phone number associated with the client device.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

FIG. 3A is a block diagram of a client device, according to one implementation;

FIG. 3B is a block diagram of a PII server, according to one implementation;

FIG. 3C is a block diagram of a linking server, according to one implementation;

Like reference numbers and designations in the various drawings indicate like elements.

DETAILED DESCRIPTION

Figure 1:
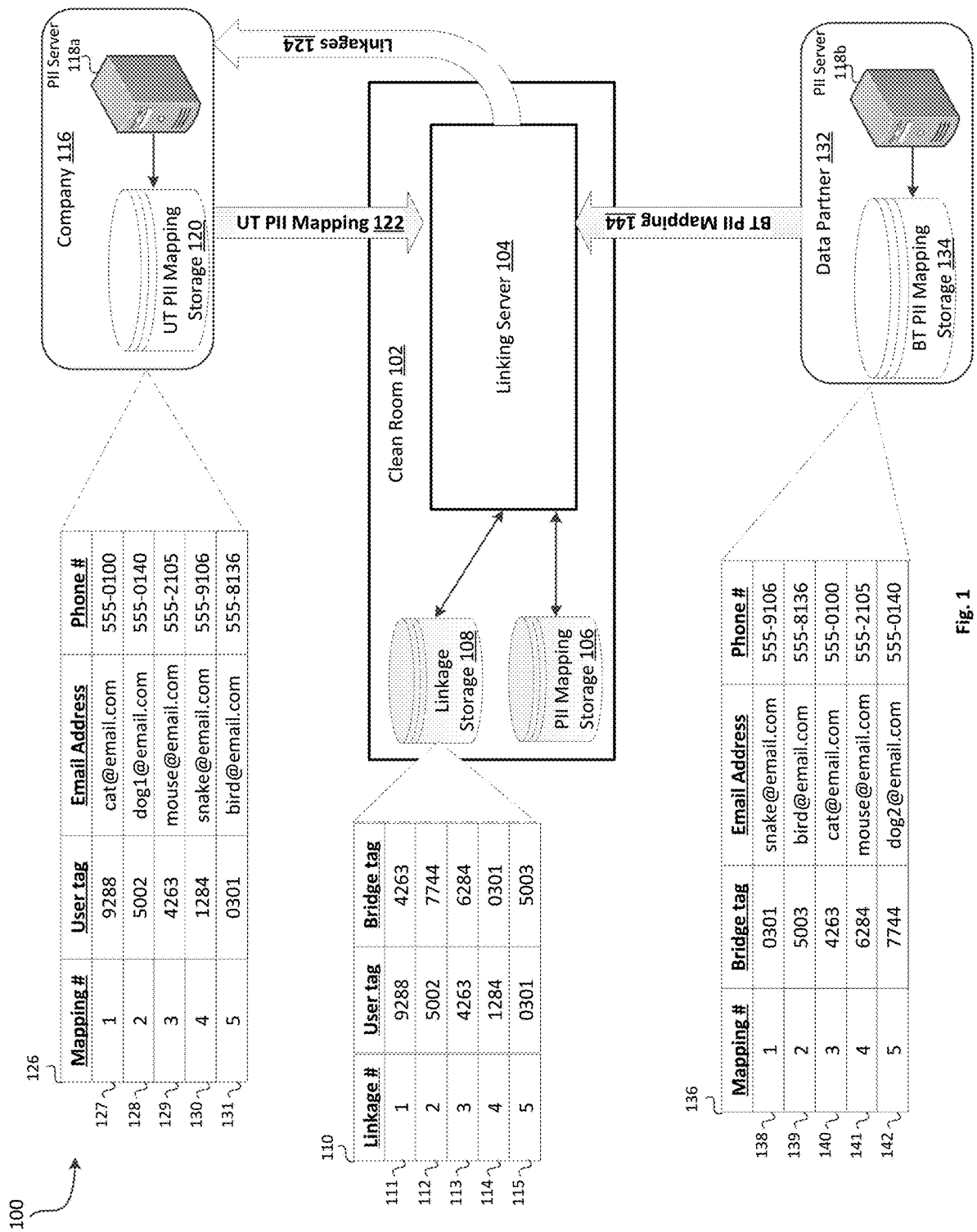
FIG. 1 is a block diagram of one implementation of an environment for establishing a link between user IDs of two parties using a data clean room.

Businesses store personal identifiable information (PII) shared by users who visit a business's website, e.g., to view content or conduct transactions. Businesses map this information to user identifiers that distinguish users from other users. By studying user ID-to-PII mapping data stored in their databases, businesses may learn about the individual purchasing habits for each of their users. Businesses may further improve the delivery of products and services to customers if they also have access to another business's PII data for the same user. For instance, a car manufacturer ("company") may promote cars on the website of their parent company and trucks on the website of their subsidiary company. A user shopping for cars on the parent company's website may share PII data (e.g., email address, phone number, etc.) with the website, which assigns the PII data to a user identifier referred to herein as a "user tag." This same user may also visit the website for a third-party company ("data partner") that promotes trucks. Similarly, the data partner receives and assigns the user's PII data to a user identifier, referred to herein as a "bridge tag." By establishing a linkage between the company's user tag and the data partner's bridge tag, the company may discover that the user also has an interest in purchasing a truck. Accordingly, the company may customize the look and feel of the parent company's car website specifically for the user to also include images of trucks available for purchase on its subsidiary company's truck website.

One approach to establishing linkage involves the data partner providing, to the company, a bridge tag paired with hashed PII data. Many hashing functions, including cryptographic hashing functions, are designed to be practically non-invertible (i.e., irreversible), such that possession of hashed data does not necessarily result in possession of the corresponding input data. The hashed PII data is the output from applying a hashing function to the PII data, allowing for comparison of PII data elements without revealing the PII data itself. In some implementations, the data partner may provide a bridge tag identifying a user and a hashed value of the user's email address. The company then compares the data partner's hashed PII data to the company's hashed PII data to establish a link between the user tag and bridge tag. This approach works well when using only a single PII data element, such as when matching a user tag and a bridge tag based only on a user's email address.

However, to match on multiple PII data elements (e.g., a user's email and phone number), the data partner must provide a bridge tag paired with both a hashed email and a hashed phone number. Consequently, this reveals internal data linkages to the company. That is, it reveals the data partner's email address to phone number linkages for the data partner's users. Sharing information between the company and data partner to match on multiple PII data in this manner may provide enough information to reveal the identity of a specific user linked to the PII data.

Accordingly, the present disclosure is directed to systems and methods for establishing a link between the user IDs of two parties (e.g., establishing a linkage between a company's user tag and a data partner's bridge tag) without exposing a party's PII data map to the other party. In some implementations, the described systems and methods use an independent or neutral intermediary, e.g., one or more servers operating in a clean room or clean room environment. In some implementations, the described systems and methods use encrypted direct communications, such as encrypted peer-to-peer communications, that are not necessarily routed through a clean room.

FIG. 1 is a block diagram of one implementation of an environment 100 for establishing a link between user identifications (ID) of two parties using a data clean room. In general, the system and method discussed herein allows two parties (e.g., a company and a data partner) to share their respective user ID-PII data maps with a server independently operating in a data clean room environment. The clean room environment is a separate, physical, and secure location isolated from the activities of the parties such that only authorized individuals (not affiliated with either of the parties) may handle sensitive data or information received from the parties. To further protect each user's identity, the parties hash their PII data associated with each user prior to sharing the user ID-PII maps with the data clean room environment. The server in the clean room matches the hashed PII data of the company's users to the hashed PII data of the data partner's users to establish a link between the company's user tags and the data partner's bridge tags to identify common users. In one implementation, the company may gather email addresses and phone numbers associated with users who visit the company's website to view content or to make a purchase of company goods. Likewise, the data partner may also gather email addresses and phone numbers associated with users who visit their website for similar reasons. Each party then sends its gathered PII data to the data clean room where the third-party server identifies the common users based on a waterfall approach, links the company's user ID ("user tag") with the data partner's user ID ("bridge tag") for each common user, and provides the linkages to the company without revealing the data partner's PII linkages (e.g., the association of a particular email address with a particular phone number) to the company. In some implementations, the linkages are provided to both the company and the data partner. In some implementations, the linkages are stored at the clean room and the parties must physically visit the clean room to retrieve the linkages.

In greater detail, the environment 100 includes a company 116, a data partner 132, and a clean room 102. The company 116 includes PII server 118a (also referred to as "company server") for delivering user tag (UT) PII mapping 122 to systems (e.g., linking server 104) in the clean room 102. The company 116 also includes UT PII mapping storage 120 for storing UT PII mapping 122. The data partner 132 includes a PII server 118b (also referred to as "partner server") for delivering bridge tags (BT) PII mapping 144 to systems (e.g., linking server 104) in the clean room 102 and BT PII mapping storage 134 for storing BT PII mapping 144.

Clean room 102 includes a linking server 104 for (1) generating linkages 124 based on UT PII mapping 122 and BT PII mapping 144, and (2) for providing the linkages 124 to company 116. Clean room 102 also includes PII mapping storage 106 for storing both UT PII mapping 122 and BT PII mapping 144. Clean room 102 also includes a linkage storage 108 for storing linkages 124. The environment 100 may include multiple companies 116 having one or more PII servers 118a, multiple data partners 132 having one or more PII servers 118b, and multiple clean rooms 102 having one or more linking servers 104. Although not illustrated, in some implementations, company 116 and data partner 132 communicate with clean room 102 by way of a network gateway, network router, network firewall, network switch, network accelerator, Wi-Fi access points or hotspots, or other devices.

PII servers 118a, 118b may gather personal identifiable information (PII) associated with a user of one or more client devices. In one implementation, PII data may include, a user's name, email address, phone number, billing information, street address, citizenship, biometrics, financial information, driver license and other governmental identification numbers, birth, birth place, employment history, family history, medical history, geolocation history, social security numbers, tax identification numbers, medical identification numbers, and device information (e.g., Media Access Control (MAC) address, device ID 314, session ID 316, and any other information that may be intercepted by the collection agent 312 illustrated in FIG. 3). PII servers 118a, 118b may assign a user identifier to each identified user of a client device. In one implementation, PII server 118a assigns a "user tag" to each user of a client device that connects or communicates to computing devices, servers, disk drives, or webpages owned, operated, or affiliated with company 116. Similarly, PII server 118b assigns a "bridge tag" to each user of a client device that connects or communicates to computing devices, servers, disk drives, or webpages owned, operated, or affiliated with data partner 132.

In some implementations, a user assigned to a user ID (e.g., user tag or bridge tag) may be associated with more than one client device. In some implementations, a user assigned to a user ID may be associated with only a single client device. PII servers 118a, 118b may periodically review user tags and bridge tags to access whether to un-assign a user tag and bridge tag from a user of a client device based on inactivity or reduced activity of the client device. In one implementation, PII server 118a may un-assign a user tag from a client device that has not communicated with PII server 118a for longer than a predetermined amount of time.

PII server 118a stores the gathered PII data and corresponding user tags for each user in user tag (UT) PII mapping storage 120 in a data structure format as illustrated by data structure 126. Data structure 126 shows the mapping of user tags to PII data. Each entry 127, 128, 129, 130, 131 represents a different user for one or more client devices. The column titled "mapping #" numbers each entry, the column titled "user tag" shows the user tag that PII server 118a assigned to that specific user, the column titled "email address" shows the email address for that specific user, and the column titled "phone #" shows the phone number for that specific user. Although shown with only two PII data columns (e.g., email address and phone #) and five entries (i.e., representing five users), data structure 126 may include any number of PII data columns and any number entries.

PII server 118b stores the gathered PII data and corresponding bridge tags for each user in bridge tag (BT) PII mapping storage 134 in a data structure format as illustrated by data structure 136. Data structure 136 shows the mapping of bridge tags to PII data. Each entry 138, 139, 140, 141, 142 represents a different user for one or more client devices. The column titled "mapping #" numbers each entry, the column titled "bridge tag" shows the bridge tag that PII server 118b assigned to that specific user, the column titled "email address" shows the email address for that specific user, and the column titled "phone #" shows the phone number for that specific user. Although shown with only two PII columns (e.g., email address and phone #) and five entries (i.e., representing five users), data structure 136 may include any number of PII data columns and any number of users.

PII servers 118a, 118b may take steps to protect the privacy of company's 116 users and data partner's 132 users. In some implementations, the PII servers 118a, 118b each apply a cryptographic hashing function to the gathered PII data associated with their respective users. In one implementation, PII server 118a may retrieve (e.g., from UT PII mapping storage 120) the email address mapped to entry 127 of data structure 126, hash the retrieved value, and overwrite the stored email address with its hash value equivalent. PII server 118a may then retrieve (e.g., from UT PII mapping storage 120) the phone number mapped to entry 127 of data structure 126, hash the retrieved value, and overwrite the stored phone number with its hash value equivalent. PII server 118a may repeat the process for each entry in UT PII mapping storage 120. PII server 118b may execute the same hashing routine for data stored in BT PII mapping storage 134. In some implementations, the PII servers 118a, 118b support cryptographic hashing functions. In some implementations, the PII servers 118a, 118b support various hash function algorithms including, for example, HMAC, SHA-1, SHA-2, SHA-3, MD2, MD4, and MD5. To ensure that linking server 104 may identify common users, company 116 and data partner 132 use the same hashing function to hash each of their respective data. In some implementations, the parties use a default hashing function generally accepted in the industry. In some implementations, the parties (e.g., company 116 and data partner 132) communicate with one another to agree on a specific hashing function to use prior to sharing their data with linking server 104.

PII server 118a may receive a request from a system in clean room 102 (e.g., linking server 104) to deliver the gathered PII data and corresponding user tags from company 116 to clean room 102. In response to the request, PII server 118a retrieves data structure 126 from UT PII Mapping Storage 120 and transmits the retrieved data (e.g., UT PII mapping 122) to linking server 104. In some implementations, PII server 118a may deliver UT PII mapping 122 to PII mapping storage 106. In some implementations, PII server 118a sends UT PII mapping 122 to linking server 104 periodically (e.g., every minute, hour, day, week, month, or any combination thereof) without receiving a request from linking server 104.

PII server 118b may receive a request from a system in clean room 102 (e.g., linking server 104) to deliver the gathered PII data and corresponding bridge tags from data partner 132 to clean room 102. In response to the request, PII server 118b retrieves data structure 136 from BT PII mapping storage 134 and transmits the retrieved data (e.g., BT PII mapping 144) to linking server 104. In some implementations, PII server 118b may deliver BT PII mapping 144 to PII mapping storage 106. In some implementations, PII server 118b sends BT PII mapping 144 to linking server 104 periodically (e.g., every minute, hour, day, week, month, or any combination thereof) without receiving a request from linking server 104.

Linking server 104 establishes links between user tags and bridge tags by using a waterfall approach. The waterfall approach first compares hashed PII data of a first type (e.g., email address) associated with each user in UT PII mapping 122 with hashed PII data of the same type (e.g., email address) associated with each user in BT PII mapping 144. Linking server 104 links the user tags and bridge tags associated with any matching PII data by storing the user tags and bridge tags in a database (e.g., linkage storage 108). In response to identifying a match, linking server 104 removes (from PII mapping storage 106) the user tag and all its associated PII data and the bridge tag and all its associated PII data. After linking server 104 compares all hashed PII data of a particular type (e.g., email address), linking server 104 compares hashed PII data of a second type (e.g., phone number) associated with each user in UT PII mapping 122 with hashed PII data of the same type (e.g., phone number) associated with each user in BT PII mapping 144. Linking server 104 continues the comparing and removing process until all PII types are compared. The waterfall approach may compare any type of PII data and in any order. In one implementation, linking server 104 may compare hashed email address, then hashed phone numbers, then hashed social security numbers. In one implementation, linking server 104 may compare hashed phone numbers, then hashed social security numbers, and then hashed email addresses. In some implementations, the waterfall approach may compare raw, un-hashed PII data. In some implementations, the waterfall approach may compare encrypted PII data. PII data may be encrypted, for example, using a version of an encryption algorithm such as triple Data Encryption Standard (DES), RSA, blowfish, twofish, or the Advanced Encryption Standard (AES).

The waterfall approach may be explained in greater detail by referencing data structures 110, 126, 136 in FIG. 1. In one implementation, linking server 104 retrieves the hashed email address (e.g., cat@email.com) from entry 127 corresponding to the first user in data structure 126 and the hashed email address (e.g., snake@email.com) from entry 138 corresponding to the first user in data structure 136. Linking server 104 compares each retrieved hashed value to determine whether the retrieved values match. Since cat@email.com does not match snake@email.com, linking server 104 retrieves the hashed email address (e.g., bird@email.com) from entry 139 corresponding to the second user in data structure 136. By comparing the retrieved values, linking server 104 determines that cat@email.com does not match bird@email.com. In response to the mismatch, linking server 104 retrieves the hashed email address (e.g., cat@email.com) from entry 140 corresponding to the third user in data structure 136. Linking server 104 compares the two values and determines a match, and in response to the match, linking server 104 establishes a link between the user tag (e.g., 9288) in entry 127 corresponding to the first user in data structure 126 and the user tag (e.g., 4263) in entry 140 corresponding to the third user in data structure 136. Linking server 104 establishes a link by generating data structure 110 and storing data structure 110 in linkage storage 108.

Once linking server 104 compares (and attempts to match) all entries in data structure 126 with data structure 136 based on a hashed email address, linking server repeats the comparison/matching process using a hashed phone number. In one implementation, linking server 104 retrieves the hashed phone number (e.g., 555-0140) from entry 128 corresponding to the second user in data structure 126 and the hashed phone number (e.g., 555-9106) from entry 138 corresponding to the first user in data structure 136. Linking server 104 compares each retrieved hashed value to determine whether the retrieved values match. Since '555-0140' does not match '555-9106,' linking server 104 retrieves the next hashed phone number (e.g., 555-8136) from entry 139 of data structure 136. Eventually, linking server finds a match between entry 128 corresponding to the second user in data structure 126 and entry 142 corresponding to the fifth user in data structure 136. By comparing multiple PII data associated with each user, linking server 104 successfully identifies all common users. In one implementation, linking server 104 failed to discover that the second user in data structure 126 and the fifth user in data structure 136 are indeed the same user because this user appears to have two different email addresses (e.g., dog1@email.com and dog2@email.com). However, Linking server 104 made a successful match when comparing multiple PII data (email address and phone number) for each user.

Linking server 104 links the user identifications of company 116 and data partner 132 by generating linkages 124 in a data structure format (e.g., data structure 110) and storing in linkage storage 108. In one implementation, data structure 110 shows the mapping of company's 116 user tags and data partner's 132 bridge tags. Each entry 111, 112, 113, 114, 115 represents a different user for one or more client devices. The column titled "linkage #" numbers each entry, the column titled "user tag" shows the user tag that PII server 118*a* assigned to that specific user, the column titled "bridge tag" shows the bridge tag that PII server 118*b* assigned to that specific user. Although shown with only two user identification columns (e.g., user tag and bridge tag) and five entries (i.e., five users), data structure 110 may include any number of user identification columns (i.e., representing the matching of user identifications from multiple data partners 132 and multiple companies 116) and any number of entries.

Linking server 104 sends linkages 124 to company 116. Although linkages 124 reveal the matching of user tags to bridge tags, they do not reveal the data partner's PII linkages (e.g., email address to phone number, email address to tax ID, phone number to social security number) to company 116. In some implementations, company 116 may de-encrypt the linkages 124 to reveal data partner's 132 PII linkages. In some implementations, linking server 104 sends linkages 124 to both company 116 and data partner 132. In some implementations, linking server 104 only stores linkages 124 in linkage storage 108. In some implementations, linking server 104 erases all contents from linkage storage 108 and PII mapping storage 106 after linking server 104 sends linkages 124 to the appropriate party (e.g., company 116, data partner 132, or both).

In some implementations, PII servers 118*a*, 118*b* and linking server 104 generate their respective data structures 110, 126, 136 using alternate data structure types, such as an array, a linked list, a record, a union, a tagged union, a class, a tree, and a queue. Accordingly, linking server 104 may establish a link between company's 116 user tags and data partner's 132 bridge tags using any of these data structure types.

Figure 2:
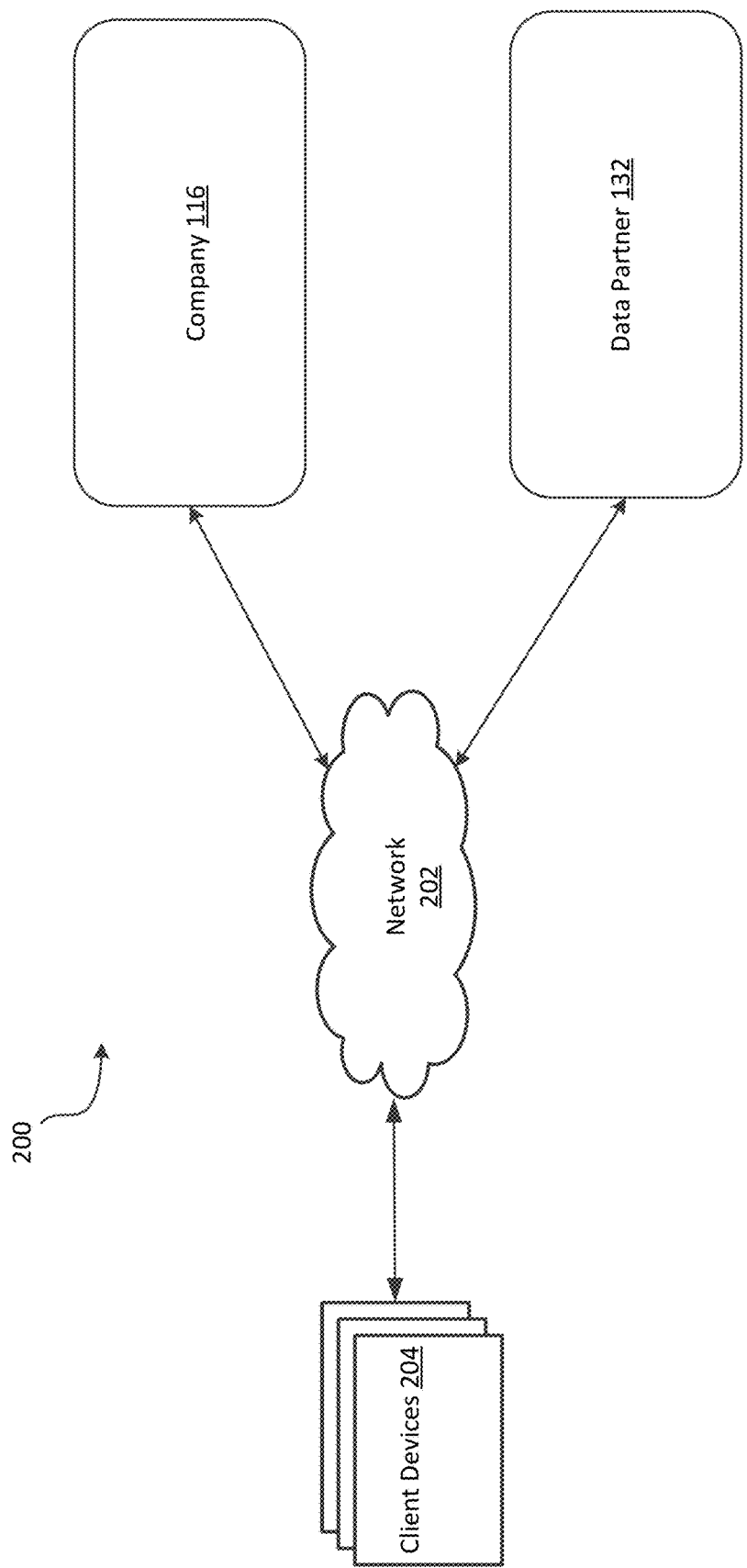
FIG. 2 is a block diagram of one implementation of an environment for parties to gather personal identifiable information (PII) data from a client device.

FIG. 2 is a block diagram of one implementation of an environment 200 for parties to gather PII data from a client device. The environment 200 may include network 202, e.g., a local area network (LAN), wide area network (WAN), the Internet, a Bluetooth network, or a combination of these or other networks, that connects a client device 204 with company 116 and data partner 132. In some implementations, data flows through the network 202 from a source node to a destination node as a flow of data packets, e.g., in the form of data packets in accordance with the Open Systems Interconnection ("OSI") layers. A flow of packets may use, for example, an OSI layer-4 transport protocol such as the User Datagram Protocol ("UDP"), the Transmission Control Protocol ("TCP"), or the Stream Control Transmission Protocol ("SCTP"), transmitted via the network 202 layered over an OSI layer-3 network protocol such as Internet Protocol ("IP"), e.g., IPv4 or IPv6. The environment 200 may include many thousands of nodes including, for example, client devices 204, companies 116, and data partners 132. Although not illustrated, in many implementations, network 202 may comprise one or more intermediary devices, including gateways, routers, firewalls, switches, network accelerators, Wi-Fi access points or hotspots, or other devices.

A client device 204 is an electronic device that is under control of a user and is capable of receiving requests for personal identifiable information (PII) and transmitting PII data over network 202. Client device 204 may be any number of different types of user electronic devices adapted to communicate via a network 202, including without limitation, a personal computer, a laptop computer, a desktop computer, a mobile computer, a tablet computer, a smartphone, a digital video recorder, a set-top box for a television, a video game console, or any other type and form of computing device or combinations of devices. In some implementations, the type of client device 204 may be categorized as a mobile device, a desktop device, a device intended to remain stationary, a device adapted to primarily access a network via a local area network (e.g., network 202), or another category of electronic devices such as a media consumption device. A client device 204 includes a user application, e.g., a web browser, to facilitate the sending and receiving of data over network 202.

FIG. 3A is a block diagram of one implementation of a client device 204 of a client. Client device 204 includes a processor 306 and memory 302. Memory 302 may store machine instructions that, when executed by processor 306 cause processor 306 to perform one or more of the operations described herein. Processor 306 may include a microprocessor, ASIC, FPGA, etc., or combinations thereof. In many implementations, processor 306 may be a multi-core processor or an array of processors. Memory 302 may include, but is not limited to, electronic, optical, magnetic, or any other storage devices capable of providing processor 306 with program instructions. Memory 302 may include a floppy disk, CD-ROM, DVD, magnetic disk, memory chip, ROM, RAM, EEPROM, EPROM, flash memory, optical media, or any other suitable memory from which processor 306 can read instructions. The instructions may include code from any suitable computer programming language such as, but not limited to, C, C++, C#, Java, JavaScript, Perl, HTML, XML, Python and Visual Basic.

Client device 204 may include one or more network interfaces 308. A network interface 308 may include any type and form of interface, including Ethernet including 10 Base T, 100 Base T, or 1000 Base T ("Gigabit"); any of the varieties of 802.11 wireless, such as 802.11a, 802.11b, 802.11g, 802.11n, or 802.11ac; cellular, including CDMA, LTE, 3G, or 4G cellular; Bluetooth or other short range wireless connections; or any combination of these or other interfaces for communicating with a network or other computing devices. In many implementations, client device 204 may include a plurality of network interfaces 308 of different types, allowing for connections to a variety of networks, such as local area networks or wide area networks including the Internet, via different sub-networks.

Client device 204 may include one or more user interfaces 304. A user interface 304 may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of client device 204, such as a built-in display, touch screen, microphone, etc., or external to the housing of client device 204, such as a monitor connected to client device 204, a speaker connected to client device 204, etc., according to various implementations.

Client device 204 may include in memory 302 an application 310 or may execute an application 310 with processor 306. Application 310 may be an application, applet, script, service, daemon, routine, or other executable logic for receiving content and for transmitting responses, commands, or other data. In one implementation, application 310 may be a web browser, while in another implementation, application 310 may be media presentation application. Application 310 may include functionality for displaying content received via network interface 308 and/or generated locally by processor 306, and for transmitting interactions received via a user interface 304, such as requests for websites, selections of survey response options, input text strings, etc.

In some implementations, application 310 may include a collection agent 312. Collection agent 312 may include an application plug-in, application extension, subroutine, browser toolbar, daemon, or other executable logic for collecting data processed by application 310 and/or monitoring interactions of a user with a user interface 304. In some implementations, collection agent 312 may be a separate application, service, daemon, routine, or other executable logic separate from application 310 but adapted for intercepting and/or collecting data processed by application 310, such as a screen scraper, packet interceptor, Application Programming Interface (API) hooking process, or other such application. Collection agent 312 may be adapted for intercepting or receiving data input via user interface 304, including mouse clicks, scroll wheel movements, gestures such as swipes, pinches, or touches, or any other such interactions; as well as data received and processed by application 310 including keyboard keystrokes.

Client device 204 may include or be identified with a device identifier 314 (shown in FIG. 3A as device ID 314). Device identifiers 314 may include any type and form of identification, including without limitation a Media Access Control (MAC) address, text and/or numerical data string, a username, a cryptographic public key, cookies, device serial numbers, user profile data, network addresses, or any other such identifier that may be used to distinguish the client device 204 from other client devices 204. In some implementations, a device identifier 314 may be associated with one or more other device identifiers 314 (e.g., a device identifier for a mobile device, a device identifier for a home computer, etc.). In many implementations, to preserve privacy, the device identifier 314 may be cryptographically generated, encrypted, or otherwise obfuscated. In some implementations, client device 204 may include a session identifier 316 (shown in FIG. 3A as session ID 316) which may be similar to a device identifier 314 but generated more frequently, such as hourly, daily, upon activation of application 310, or any other such period. Session identifier 316 may be generated by a client device 204 or received from a server or other device. Session identifier 316 may be used in place of device identifiers 314 to increase anonymity, or may be used in connection with device identifiers 314 to distinguish interactions of one session from those of another session.

Client device 204 may be adapted to receive requests to deliver device identifiers 314, session identifiers 316, and any other PII data collected by collection agent 312 to a computing device, such as a server (e.g., PII server 118*a*, PII server 118*b* linking server 104). In one implementation, client device 204 may receive a request from PII servers 118*a* to deliver one or more items of PII data associated with client device 204. In response to the request, collection agent 312 searches all software (e.g., cookies stored by browsers) and hardware components (e.g., devices connected to network interface 308, devices connected to user interface 304, cache areas of processor 306, and memory 302) of client device 204 for all PII data. In some implementations, collection agent 312 may query application 310 for new PII data not yet stored on client device 204. In one implementation, collection agent 312 may send a request to an internet browser prompting the user of client device 204 with a pop-up window requesting additional user information. The user of client device 204 may respond by entering the requested information in the pop-up window to make available to collection agent 312 for PII gathering. Client device 204 provides the identifiers 314, session identifiers 316, and any other PII data collected by collection agent 312 to the requesting server (e.g., PII server 118*a*, PII server 118*b*, linking server 104). In some implementations, client device 204 compresses (e.g., .bz2, .F, .gz, .lz, .lzma, .lzo, .rz, .sfark, .sz, .xz, .z, .Z) the gathered PII data prior to transmission to the requesting server. In some implementations, client device 204 packages the PII data into an archive file (e.g., .7z, .apk, .bl, .ba, .cab, .cfs,.ear, .jar, .zip). In some implementations, client device 204 periodically transmits PII data to a server without the need to receive a request.

FIG. 3B is a block diagram of a personal identifiable information (PII) server 118, according to one implementation, such as PII servers 118a, 118b (collectively referred to as PII server 118) of FIG. 1. As with client device 204, a PII server 118 may include one or more processors 306, memories 302, network interfaces 308, and user interfaces 304. In some implementations referred to as headless servers, a PII server 118 may not include a user interface 304, but may communicate with client devices 204 with user interfaces 304 via a network. Memory 302 may include PII data storage 326 to store PII data received from client device 204 prior to PII server 118 mapping the PII data to a user tag or bridge tag. In some implementations, memory 302 may store one or more applications 310 (not illustrated) for execution by processor 306 of the PII server 118, including File Transfer Protocol (FTP) servers, web servers, mail servers, file sharing servers, peer-to-peer servers, or other such applications for receiving PII data stored in client PII data storage 320 from client devices 204, delivering PII data (e.g., UT PII mapping 122, BT PII mapping 144), and receiving linkages 124.

PII server 118 may include a PII gathering engine 324. A PII gathering engine 324 may comprise an application, service, routine, server, daemon, or other executable logic for gathering PII data from one or more client devices 204 by executing process 400 shown in FIG. 4. In some implementations, the application, service, routine, server, daemon, or other executable logic executes process 500, shown in FIG. 5, to prepare and deliver data (e.g., UT PII mapping 122, BT PII mapping 144) to linking server 104 and receive data from linking server 104 (e.g., linkages 124). In some implementations, the application, service, routine, server, daemon, or other executable logic executes process 600, shown in FIG. 6, to prepare and deliver data (e.g., UT PII mapping 122, BT PII mapping 144) to linking server 104 and receive data from linking server 104 (e.g., linkages 124).

FIG. 3C is a block diagram of a user identification (UI) linking server, according to one implementation, such as linking server 104 of FIG. 1. As with client device 204, a linking server 104 may include one or more processors 306, memories 302, network interfaces 308, and user interfaces 304. In some implementations referred to as headless servers, a linking server 104 may not include a user interface 304, but may communicate with client devices 204 with user interfaces 304 via a network. Memory 302 may include PII mapping data storage 352 to store the PII mapping data (e.g., UT PII mapping 122, BT PII mapping 144) for faster read and write access as compared to storing in external storage. In some implementations, memory 302 may store one or more applications 310 (not illustrated) for execution by processor 306 of the linking server 104, including File Transfer Protocol (FTP) servers, web servers, mail servers, file sharing servers, peer-to-peer servers, or other such applications for receiving PII mapping data (e.g., UT PII mapping 122, BT PII mapping 144) from PII servers 118 and delivering linkages 124 to PII servers 118.

Linking server 104 may include a linking engine 354. A linking engine 354 may comprise an application, service, routine, server, daemon, or other executable logic for establishing a link between user IDs (e.g., user tag, bridge tag) by executing process 500 shown in FIG. 5. In some implementations, the application, service, routine, server, daemon, or other executable logic establishes a link between user IDs (e.g., user tag, bridge tag) by executing process 600, shown in FIG. 6.

Figure 4:
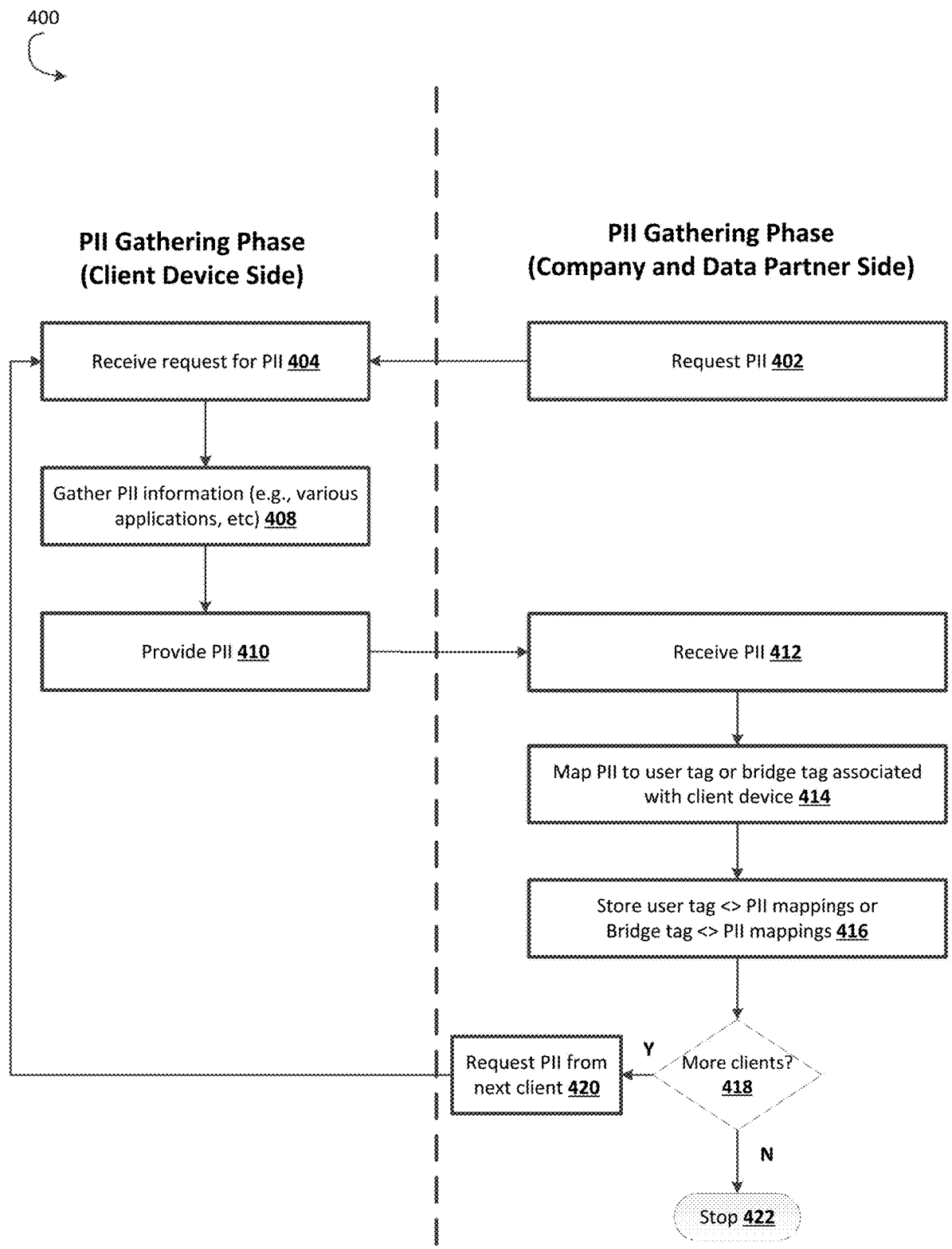
FIG. 4 is a flow diagram of the operations taken by a PII server and client device(s) in some implementations of a process for gathering PII data.

FIG. 4 is a flow diagram of the operations taken by a PII server and client device(s) in some implementations of a process 400 for gathering PII data. In some implementations, the process 400 may be performed by PII servers 118a, 118b in FIG. 1 and one or more client devices 204 in FIG. 2. In particular, linking server 104 performs operations 402, 412, 414, 416, 418, 420, and 422 and PII servers 118a, 118b perform operations 404, 408, and 410. Each operation may be re-ordered, added, or removed.

Process 400 begins with operation 402, where PII servers 118a, 118b ("requesting servers") send a request to client device 204 for PII data. At operation 404, client device 204 receives the request for PII data. At operation 408, client device 204 gathers PII data located on client device 204. In one implementation, client device 204 triggers collection agent 312 to searches all software (e.g., cookies stored by browsers) and hardware components (e.g., devices connected to network interface 308, devices connected to user interface 304, cache areas of processor 306, and memory 302) of client device 204 for all PII data. In some implementations, collection agent 312 may query application 310 for new PII data not yet stored on client device 204. In one implementation, collection agent 312 may send a request to an internet browser prompting the user of client device 204 with a pop-up window requesting additional user information. The user of client device 204 may respond by entering the requested information in the pop-up window to make available to collection agent 312 for PII gathering. After gathering all or a portion of PII data associated with client device 204, client device 204 delivers the PII data to the requesting server (e.g., PII server 118a, PII server 118b).

At operation 412, the requesting server receives the delivered PII data. At operation 414, the requesting server maps the PII data to the user identification (e.g., user tag or bridge tag) associated with the client device. In one implementation, if PII server 118a (located at company 116) requests the information, then PII server 118a will identify each user of a client device (based on device ID 314) that communicates with any computing device affiliated with company 116 and assigns a "user tag" to the received PII data for the user of the client device. Similarly, if PII server 118b (located at data partner 132) requests the information, then PII server 118b will identify each user of a client device (based on device ID 314) that communicates with any computing device affiliated with data partner 132 and assigns a "bridge tag" to the received PII data for the user of the client device.

At operation 416, the requesting server organizes the assigned user tags into a data structure format (e.g., data structure 126, data structure 136) and stores the data structure in a database (e.g., UT PII mapping storage 120, BT PII mapping storage 134). In some implementations, the requesting server organizes the assigned user tags and PII data into an array, a linked list, a record, a union, a tagged union, a class, a tree, a queue, or a flat file. The requesting server may separate tabular data in a flat file by using special characters, such as a comma, a semicolon, a tab, a space, an underscore, or a hyphen. In one implementation, the requesting server may store the contents of data structure 126 in a comma-separated text file, e.g., as follows:

1, 9288, cat@mail.com, 555-0100
2, 5002, dog1@email.com, 555-0140
3, 4263, mouse@email.com, 555-2105
4, 1284, snake@email.com, 555-9106

5, 0301, bird@email.com, 555-8136

At operation 418, the requesting server determines if additional clients are affiliated with the requesting server. If there are additional clients, then at operation 420 the requesting server sends a PII data request to the next client device 204 and proceeds to operation 404 to repeat process 400. Once requests have been sent to all client devices, the process ends at operation 422.

Figure 5:
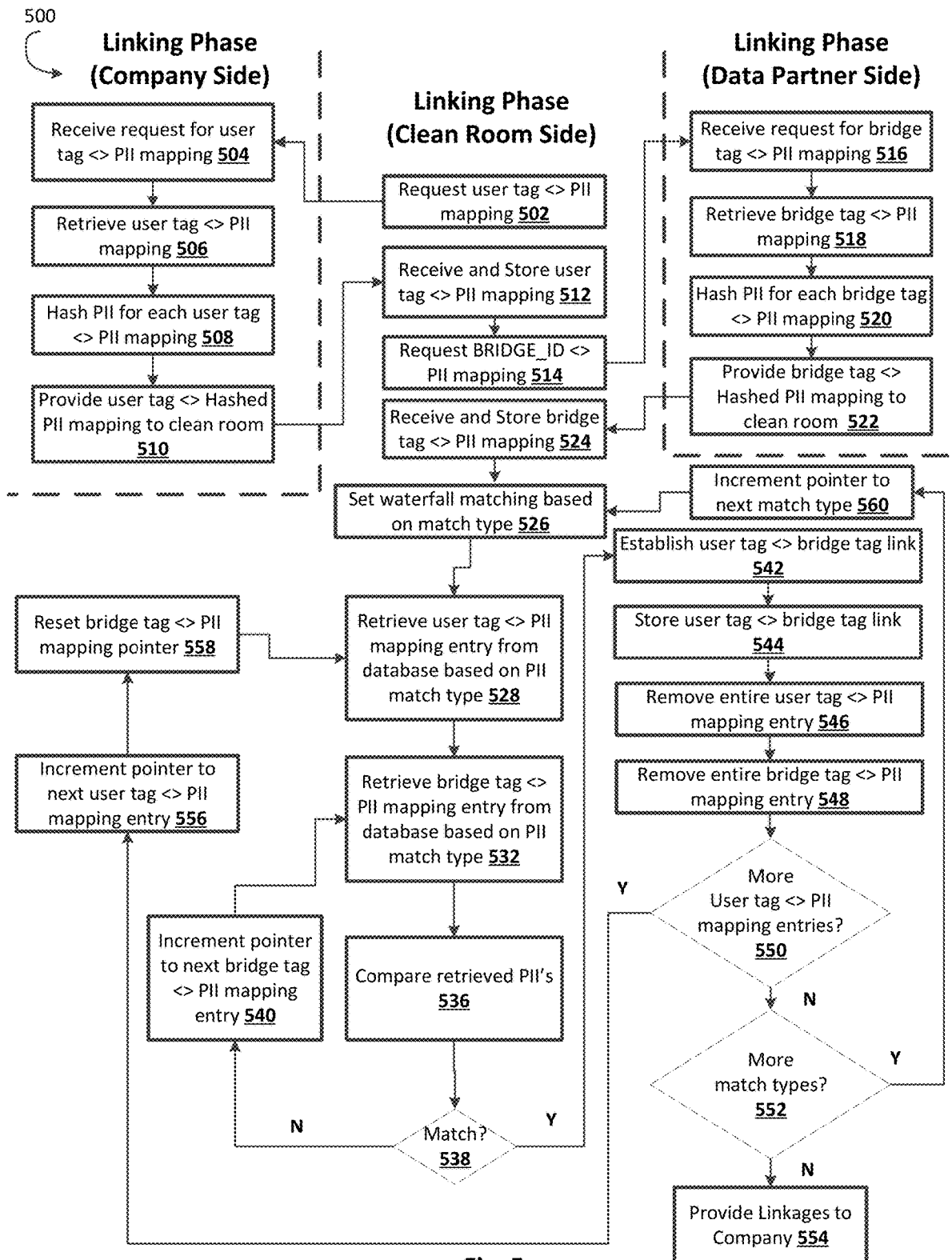
FIG. 5 is a flow diagram of the operations taken by a linking server and PII servers in some implementations of a process for linking user tags and bridge tags.

FIG. 5 is a flow diagram of the operations taken by a linking server and PII servers in some implementations of a process 500 for linking user tags and bridge tags. In some implementations, process 500 may be performed by linking server 104 and PII servers 118a, 118b in FIG. 1. The process 500 describes a linking phase using a waterfall approach. Each operation may be re-ordered, added, or removed.

From operation 502 to operation 512, linking server 104 gathers a first set of data from company 116. In one implementation, at operation 502, linking server 104 sends a request to PII server 118a for the user tag to PII mapping (e.g., UT PII mapping 122) maintained by company 116. At operation 504, PII server 118a receives the request and in response to receiving the request, PII server 118a, at operation 506, retrieves the user tag to PII mapping (e.g., UT PII mapping 122) from storage (e.g., UT PII mapping storage 120). At operation 508, PII server 118a hashes the PII data associated with each user tag. In one implementation, PII server 118a retrieves from UT PII mapping 122 (or UT PII mapping storage 120) the email address associated with entry 127 of data structure 126, hashes the retrieved value, and overwrites the stored email address with its hash value equivalent. PII server 118a then retrieves from UT PII mapping 122 (or UT PII mapping storage 120) the phone number associated with entry 127 of data structure 126, hashes the retrieved value, and overwrites the stored phone number with its hash value equivalent. PII server 118a may repeat the process for each entry in UT PII mapping storage 120. In some implementations, PII server 118a may encrypt (instead of hashing) the PII data, e.g., using triple Data Encryption Standard (DES), RSA, blowfish, twofish, or the Advanced Encryption Standard (AES). In some implementations, PII server 118a may skip operation 508 such to proceed to operation 510 using raw, un-hashed PII data. In some implementations, each PII server 118 may back-up the contents of their respective storage (e.g., UT PII mapping storage 120, BT PII mapping storage 134) in a secondary storage (not shown) prior to hashing and overwriting the storage contents.

At operation 510, PII server 118a retrieves the hashed PII mapping (e.g. UT PII mapping 122) from a data storage (e.g., UT PII mapping storage 120) and delivers the hashed PII mapping (e.g., UT PII mapping 122) to linking server 104. At operation 512, linking server 104 receives UT PII mapping 122 from PII server 118a and stores UT PII mapping 122 in a data storage (e.g., PII mapping storage 106).

From operation 514 to operation 524, linking server 104 gathers a second set of data from data partner 132. In one implementation, at operation 516, linking server 104 sends a request to PII server 118b for the bridge tag to PII mapping (e.g., BT PII mapping 144) maintained by data partner 132. At operation 516, PII server 118b receives the request and in response to receiving the request, PII server 118b, at operation 518, retrieves the bridge tag to PII mapping (e.g., BT PII mapping 144) from storage (e.g., BT PII mapping storage 134). At operation 520, PII server 118b hashes the PII data associated with each bridge tag. In some implementations, PII server 118b may encrypt (instead of hashing) the PII data, e.g., using triple Data Encryption Standard (DES), RSA, blowfish, twofish, or Advanced Encryption Standard (AES). In some implementations, PII server 118b may skip operation 520 such to proceed to operation 522 using raw, un-hashed PII data. At operation 520, PII server 118b retrieves the hashed PII mapping (e.g. BT PII mapping 144) from a data storage (e.g., BT PII mapping storage 134) and delivers the hashed PII mapping (e.g., BT PII mapping 144) to linking server 104. At operation 524, linking server 104 receives BT PII mapping 144 from PII server 118b and stores BT PII mapping 144 in a data storage (e.g., PII mapping storage 106).

In some implementations, PII servers 118a, 118b hash their respective PII data in response to the satisfaction of a triggering event, such as, a predetermined time of day (e.g., specific dates, days of the week, every day, days of the month, such as "at 7:00 pm on Mondays" or "every day after 7:00 pm"), each time a PII server receives new PII data from a client device, or each time a client device connects to a PII server.

Still referring to FIG. 5, at operation 526, linking server 104 begins the waterfall approach of linking user tags to bridge tags by setting the waterfall match type (e.g., email address, phone number, social security number). In one implementation, linking server 104 may select the waterfall match type to be the email address for each user. Accordingly, operations 528 to 560 will link user tags to bridge tags based on each user's email address. In one implementation, linking server 104 may select the waterfall match type to be the phone number for each user. Accordingly, operations 528 to 560 will link user tags to bridge tags based on each user's phone number. The match type may be adapted as any PII data value, as described herein.

At operation 528, linking server 104 retrieves the user tag to PII mapping entry from a database (e.g., PII mapping storage 106) based on the selected PII match type from operation 526. In one implementation, data structure 126 illustrates the data structure for UT PII mapping 122 received by linking server 104. Linking server 104 maintains this same data structure when storing UT PII mapping 122 in PII mapping storage 106. If linking server 104 selects 'email address' as the match type (i.e., at operation 526), then linking server 104 retrieves the hashed email address (e.g., cat@email.com) from entry 127 corresponding to the first user in data structure 126.

At operation 532, linking server 104 retrieves the bridge tag to PII mapping entry from a database (e.g., PII mapping storage 106) based on the selected PII match type from operation 526. In one implementation, data structure 136 illustrates the data structure for BT PII mapping 144 received by linking server 104. Linking server 104 maintains this same data structure when storing BT PII mapping 144 in PII mapping storage 106. Subsequently, linking server 104 retrieves the hashed email address (e.g., snake@email.com) from entry 138 corresponding to the first user in data structure 136.

At operation 536, linking server 104 compares the retrieved user tag to PII mapping entry and the retrieved bridge tag to PII mapping entry to determine whether the retrieved values match (operation 538). If a match is not found, then linking server 104 increments a pointer (e.g., a memory pointer, database pointer, stack pointer) to the next bridge tag to PII mapping entry and proceeds back to operation 532. In some implementation, linking server 104 moves the pointer to entry 139 (e.g., bird@email.com) of data structure 136. However, if a match is found, then linking server 104 proceeds to operation 542.

Linking server 104 may compare the values using a string comparison algorithm, such as a Brute Force algorithm, a Deterministic Finite Automaton algorithm, a Karp-Rabin algorithm, a Shift Or algorithm, a Morris-Pratt algorithm, a Knuth-Morris-Pratt algorithm, a Simon algorithm, a Colussi algorithm, a Galil-Giancarlo algorithm, an Apostolico-Crochemore algorithm, a Not So Naive algorithm, a Boyer-Moore algorithm, a Turbo BM algorithm, an Apostolico-Giancarlo algorithm, a Reverse Colussi algorithm, a Horspool algorithm, a Quick Search algorithm, a Tuned Boyer-Moore algorithm, a Zhu-Takaoka algorithm, a Berry-Ravindran algorithm, a Smith algorithm, a Raita algorithm, a Reverse Factor algorithm, a Turbo Reverse Factor algorithm, a Forward Dawg Matching algorithm, a Backward Nondeterministic Dawg Matching algorithm, a Backward Oracle Matching algorithm, a Galil-Seiferas algorithm, a Two Way algorithm, a String Matching on Ordered Alphabets algorithm, an Optimal Mismatch algorithm, a Maximal Shift algorithm, a Skip Search algorithm, a Knuth-Morris-Pratt (KMP) Skip Search algorithm, and an Alpha Skip Search algorithm. In some implementation, using a brute force algorithm, linking server 104 parses both cat@email.com and snake@email.com into a first set of individual characters and a second set of individual characters. Linking server 104 then compares the first character of the first set of individual characters (e.g., 'c' from cat@email.com) with the first character of the second set of individual characters (e.g., 's' from snake@email.com). If there is a match, then linking server 104 compares the second character of the first set of individual characters (e.g., 'a' from cat@email.com) with the second character of the second set of individual characters (e.g., 'n' from snake@email.com). Linking server 104 continues the character-to-character comparison to verify that all characters in the first set of individual characters (e.g., cat@email.com) match all characters in the second set of individual characters (e.g., snake@email.com).

At operation 542, linking server 104 establishes a link between the retrieved user tag and the retrieved bridge tag. In one implementation, linking server 104 may establish a link by generating data structure 110. Each entry of data structure 110 may represent the user common to both company 116 (represented with a user tag) and data partner 132 (represented with a bridge tag).

At operation 544, linking server 104 stores the generated data structure 110 in linkage storage 108. For each match identified in operations 536 and 538, linking server 104 appends the corresponding user tag and bridge tag. In some implementations, linking server 104 writes to the first entry of data structure 110 and pushes all other entries down by one.

At operation 546 linking server removes or deletes the retrieved user tag and all associated PII data from PII mapping storage 106. Similarly, at operation 548, linking server 104 removes or deletes the retrieved bridge tag and all associated PII data from PII mapping storage 106. In some implementations, linking server 104 may concatenate the information with a special character (such as one of: @ ',', #, $, %, ^, &, *, /, \, __, a number sequence (e.g., 999), or any combination thereof instead of deleting the information. For example, linking server 104 may replace bridge tag '0301' in entry 138 of data structure 136 with '#0301#'. In some implementations, special characters may instruct linking server 104 to step over the entry during processing or perform other customized operations.

At operation 550, linking server 104 checks whether additional user tag to PII mapping entries (e.g., entries 127, 128, 129, 130, 131) exist in data structure 126. If yes, then linking server 104 proceeds to operation 556 to increment a pointer to the next user tag to PII mapping entry, proceeds to operation 558 to reset the bridge tag to PII mapping pointer to the first entry (e.g., entry 138) of data structure 136, and proceeds back to operation 528 to repeat the process using new retrieved values. If no, then linking server 104 proceeds to operation 552 to check whether additional match types exist in the match type sequence. If there are additional match types (e.g., email address, phone number), then linking server 104 proceeds to operation 560 to increment the pointer to the next match type and then operation 526 to set the waterfall matching process to use the next match type. However, if linking server 104 determines that there are no additional match types at operation 552, then linking server 104 proceeds to operation 554. At operation 554, linking server 104 delivers linkages 124 to company 116.

Figure 6:
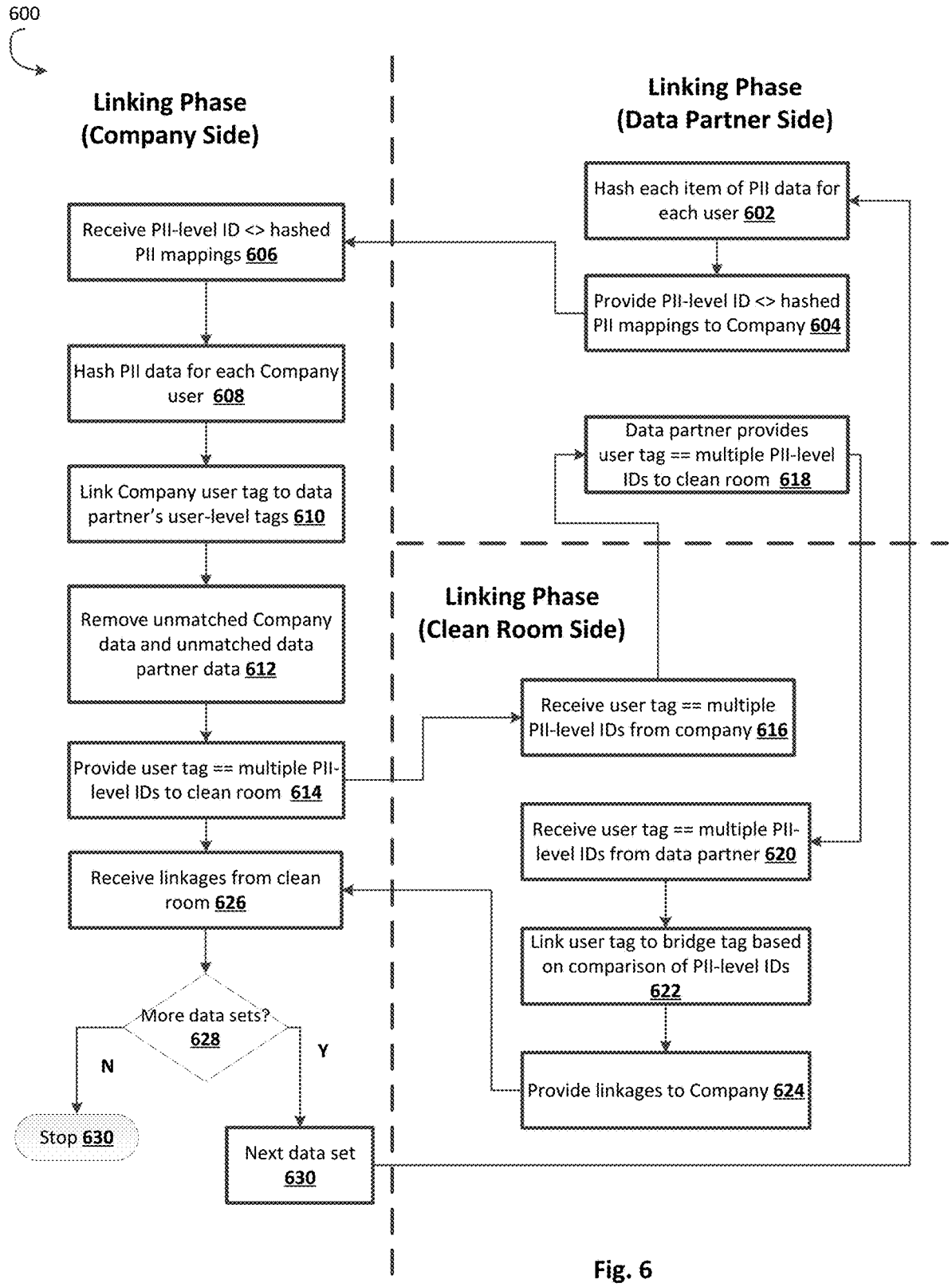
FIG. 6 is a flow diagram of the operations taken by a linking server and PII servers in some implementations of a process for linking user tags and bridge tags.

FIG. 6 is a flow diagram of the operations taken by a User Identification (ID) linking server and PII servers in some implementations of a process 600 for linking user tags and bridge tags. In some implementations, the process 600 may be performed by linking server 104 and PII servers 118*a*, 118*b* in FIG. 1. In particular, each clean room 102 operation is performed by linking server 104, each company 116 operation is performed by PII server 118*a*, and each data partner 132 operation is performed by PII server 118*b*. The process 600 describes an alternate linking phase that includes data partner 132 sharing data with company 116 prior to each party delivering their data to clean room 102 for linking of user IDs (e.g., users tags, bridge tags). Each operation may be re-ordered, added, or removed.

For process 600, PII server 118*b* (i.e., data partner 132) stores a user-level ID (referred to as a "bridge tag") to identify each user and multiple PII-level IDs (referred to as "PII tag-1", "PII tag-2", "PII tag-3" . . . "PII tag-n") to identify each PII data (e.g., email address, phone number) linked to the user. The linking of the user-level ID and each of its associated PII-level IDs may be illustrated with the following mapping expression:

$$\text{Bridge tag} <> \text{Email (PII tag-1)} <> \text{Phone Number (PII tag-2)} \qquad (1)$$

In mapping expression (1), the bridge tag assigned to a particular user is associated (< >) with a first PII-level ID (e.g., PII tag-1) representing the user's email address and associated (< >) with a second PII-level ID (e.g. PII tag-2) representing the user's phone number. That is, the user's actual email address and actual phone number are not shown in this expression. Instead, the user's personal identifiable information is represented by PII-level IDs. This same nomenclature is used to describe the operations of process 600.

At operation 602, PII server 118*b* hashes each PII data associated with each user affiliated with data partner 132. The hashing procedure and available hashing algorithms described in process 500 of FIG. 5 also apply to process 602. In some implementations, PII server 118*b* may encrypt each PII data (instead of hashing) using, e.g., triple Data Encryption Standard (DES), RSA, blowfish, twofish, or Advanced Encryption Standard (AES).

At operation 604, PII server 118*b* provides the multiple PII-level ID < > hashed PII mappings for each of its users to PII server 118*a* at company 116. In one implementation, PII server 118*b* sends to PII server 118*a*, the PII-level ID for a first user's email address (e.g., PII tag-1) associated with (< >) the hashed value of the email address (e.g., hashed (cat@email.com)) associated with (< >) the PII-level ID for the first user's phone number (e.g., PII tag-2) associated with (< >) the hashed value of the phone number (e.g., hashed (555-0100)). Accordingly, PII server 118b sends the following mapping to PII server 118a for the second user:

PII tag-1 < > hashed (cat@email.com) < > PII tag-2
    < > hashed (555-0100).     (2)

Furthermore, PII server 118b sends to PII server 118a, the PII-level ID for a second user's email address (e.g., PII tag-3) associated with (< >) the hashed value of the email address (e.g., hashed (dog1@email.com) associated with (< >) the PII-level ID for the second user's phone number (e.g., PII tag-4) associated with (< >) the hashed value of the phone number (e.g., hashed (555-0140)). Accordingly, PII server 118b sends the following mapping to PII server 118a for the second user:

PII tag-3 < >hashed (dog1@email.com) < > PII
    tag-4 < > hashed (555-0100).     (3)

At operation 606, PII server 118a receives the PII-level ID < > hashed PII mappings from PII server 118b and stores the received data in local storage (e.g., UT PII mapping storage 120) or external storage (e.g., cloud database, remote storage).

At operation 608, PII server 118a hashes each PII data associated with each user affiliated with company 116. The hashing procedure and available hashing algorithms described in process 500 of FIG. 5 also apply to process 602. In some implementations, PII server 118a may encrypt each PII data (instead of hashing), using, e.g., triple Data Encryption Standard (DES), RSA, blowfish, twofish, or Advanced Encryption Standard (AES). To ensure a successful linking of user tags and bridge tags, PII server 118a and PII server 118b use the same hashing function to hash each of their respective data. In some implementations, the parties use a default hashing function generally accepted in the industry. In some implementations, the parties (company 116 and data partner 132) communicate with one another to agree on a specific hashing function.

At operation 610, PII server 118a establishes a link between the user IDs of company 116 ("user tag") and the multiple PII-level IDs received from PII server 118b. To establish a link, PII server 118a compares it hashed PII data to the data partner's 132 hashed PII data using any of the string comparison algorithms described herein (e.g., Brute Force algorithm, a Deterministic Finite Automaton algorithm, a Karp-Rabin algorithm, etc.). If PII server 118a determines a match between company's 116 hashed PII data and data partner's 132 hashed PII data, then PII server 118a links (==) company's 116 user tag to data partner's 132 multiple PII-level IDs associated with that user. In one implementation, the data partner 132 provides the following mapping for a first user to company 116:

PII tag-1 < > hashed (cat@email.com) < > PII tag-2
    < > hashed (555-0100).     (4)

where PII tag-1 is the PII-level ID for the email address of cat@email.com and PII tag-2 is the PII-level ID for the phone number of 555-0100.

PII server 118a retrieves the following mapping from storage (e.g., UT PII mapping storage 120, cloud storage).

user tag-1 < >hashed (cat2@email.com) < > hashed
    (555-0100).     (5)

where user tag-1 is the user ID for the same "first" user and cat@email.com is the first PII data associated with the first user and 555-0100 is the second PII data associated with the first user.

PII server 118a performs a string comparison between the hashed PII data of mapping (4) with the hashed PII data of mapping (5). In some implementations, PII server 118a performs a string comparison in the following order:

First PII data of Mapping (4) compared to First PII data of Mapping (5)
Second PII data of Mapping (4) compared to Second PII data of Mapping (5)
First PII data of Mapping (4) compared to Second PII data of Mapping (5)
Second PII data of Mapping (4) compared to First PII data of Mapping (5)

In one implementation, PII server 118a compares hashed (cat@email.com) from mapping (4) to hashed (cat2@email.com) from mapping (5) to determine a match. Accordingly, PII server 118a links (==) the user ID (e.g., user tag-1) at company 116 assigned to the "first" user the PII-level ID (e.g., PII tag-1) for the first hashed PII data and the PII-level ID (e.g., PII tag-2) for the second hashed PII data as follows:

User tag-1==PII tag-1, PII tag-2     (6)

PII server 118a saves the user tag to user-level ID linkages in storage (e.g., UT PII mapping storage 120) for each matching user.

At operation 612, PII server 118a removes from storage (e.g., UT PII mapping storage 120) all unmatched data. In one implementation, PII server 118a removes all of company's 116 user tags and associated PII data, and all data partner's 132 PII-level ID < > hashed PII data that fail to match.

At operation 614, PII server 118a retrieves the user tag to user-level ID linkages from storage (e.g., UT PII mapping storage 120) and provides it to the linking server 104 in clean room 102. At operation 616, linking server 104 receives the provided data from PII server 118a and stores it in a data storage (e.g., PII mapping storage 106). At operation 618, PII server 118b retrieves the bridge tag to user-level ID linkages from storage (e.g., BT PII mapping storage 134) and provides it to the linking server 104 in clean room 102. At operation 620, linking server 104 receives the provided data from PII server 118b and stores it in a data storage (e.g., PII mapping storage 106).

At operation 622, linking server 104 establishes a link between each user tag and bridge tag by comparing and matching the PII-level IDs from PII server 118a (i.e., company 116) and the PII-level IDs from PII server 118b (i.e., data partner 132). To establish a link, linking server 104 applies the same string comparison technique of operation 610, as described herein.

At operation 624, linking server 104 provides the user tag to bridge tag linkages to PII server 118a (i.e., company 116). At operation 626, PII server 118a receives linkages 124. At operation 628, PII server 118a checks storage at company 116 (e.g., UT PII mapping storage 120) to determine if process 600 needs to be repeated for additional data sets. If no, then process 600 ends at operation 630. If yes, then process 600 proceeds to operation 632 to select the next data set and then proceeds to operation 602 to repeat process 600.

Many encryption standards have a commutative property such that encrypting a value twice, once with each of two different keys, will result in the same encrypted value regardless of which key is used first. That is, for a commutative encryption function Encrypt( ) the result of Encrypt (Key1, Encrypt(Key2, message)) is equivalent to the result of Encrypt(Key2, Encrypt(Key1, message)). Accordingly, the comparisons described above, in reference to FIG. 5 and FIG. 6, can be conducted on data that has been double-encrypted. In some implementations, as described in more detail below, two parties may exchange data encrypted with respective secret keys and compare the exchanged data by further encrypting it with the other of the respective secret keys. Each party has the same result (suitable for comparisons) regardless of which secret key was used first, and without sharing the secret keys. The process 700, illustrated in FIG. 7, uses this feature of commutative encryption to establish a linkage between user tags and a data partner's bridge tags without use of a clean room environment and without sharing internal PII mappings.

Figure 7:
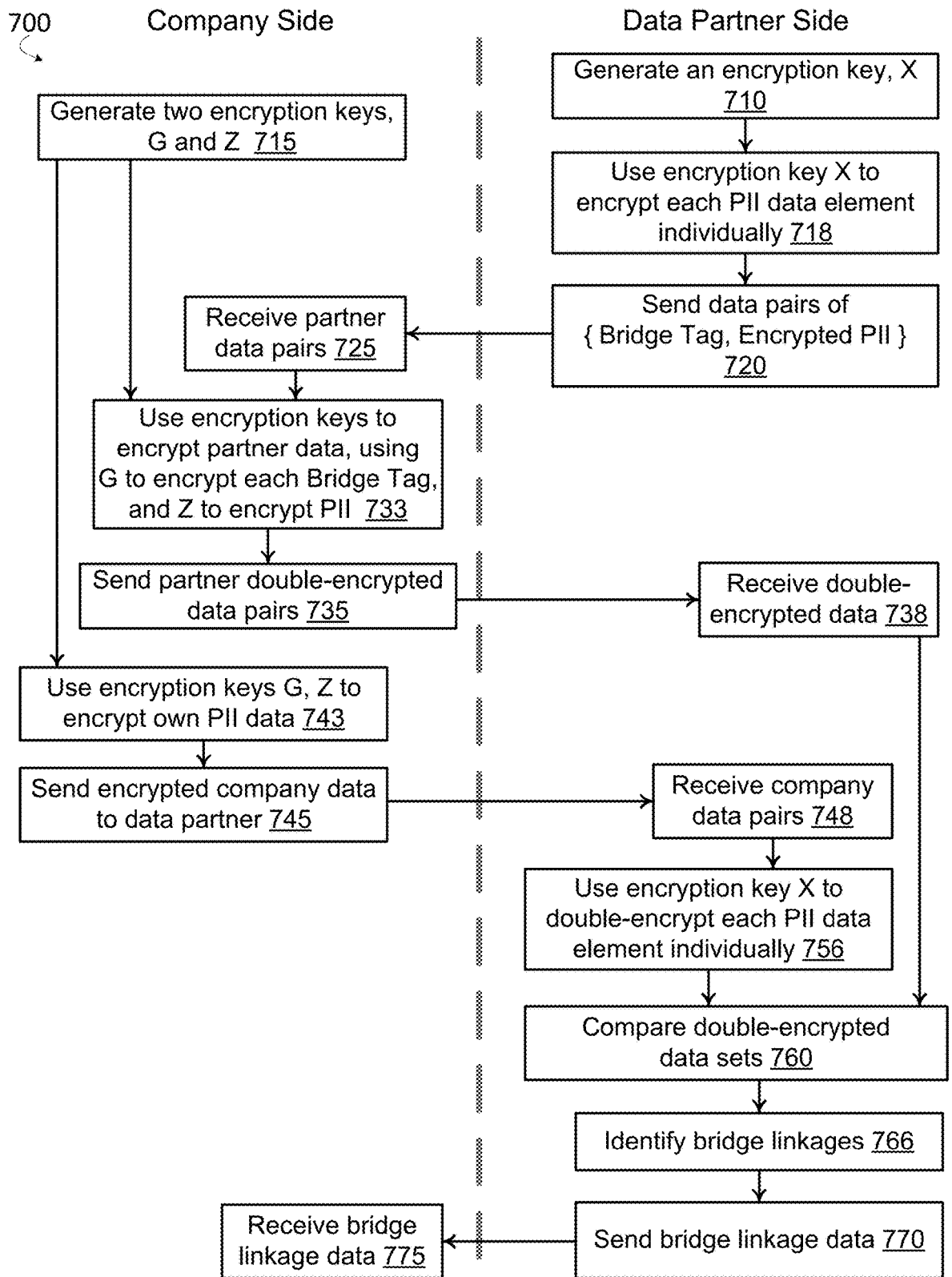
FIG. 7 is a flow diagram of the operations taken by PII servers in some implementations of a process for linking user tags and bridge tags without use of a clean room environment.

FIG. 7 is a flow diagram of the operations taken by PII servers in some implementations of a process 700 for linking user tags and bridge tags without use of a clean room environment. In some implementations, the process 600 may be performed by PII servers 118a, 118b shown in FIG. 1. In particular, each company 116 operation is performed by PII server 118a and each data partner 132 operation is performed by PII server 118b. The process 600 describes an alternate process for bringing encrypted PII data together in one place for comparison without exposing PII mappings. In some implementations, once the PII server 118b has the encrypted data, the PII data is then compared in the same waterfall fashion previously described. Each operation may be re-ordered, added, or removed.

For process 600, the company 116 PII server 118a stores a user-level ID (referred to as a "user tag") to identify a user, the data partner 132 PII server 118b stores a user-level ID (referred to as a "bridge tag") to identify a user, and each of the PII servers 118a, 118b store multiple PII data elements corresponding to various PII data (e.g., email address, phone number) linked to the users. The PII server 118b generates data pairs of bridge tags (e.g., "BT1," "BT2," etc.) and encrypted individual PII data elements (e.g., "PII1.1," "PII1.2," "PII2.1," etc., referred to in encrypted form as "E(Key,PII#)" to indicate the data encrypted and the encryption key used). The encryption algorithm used for encrypting the PII data elements is a deterministic commutative encryption algorithm (e.g., exponentiation modulo a large prime). The company 116 PII server 118a further encrypts the user tags and bridge tags. The algorithm used to by the company 116 PII server 118a to encrypt the user tags and bridge tags is a deterministic encryption algorithm, but does not need to be commutative and, in some implementations, is a different algorithm then the one used for encrypting PII data. Symmetric encryption algorithms (using a single key for both encryption and decryption) or asymmetric encryption algorithms (using a pair of keys, one for encryption and the other for reciprocal decryption) may be used. The following description assumes a symmetric (single key) algorithm is used for each encryption action, and as such only encryption keys are described. However, in some implementations, one or more asymmetric encryption algorithms may be used.

As described in more detail below, in the process 700, each of the PII servers 118a, 118b encrypt the PII data such that the data partner 132 PII server 118b obtains a set of double-encrypted PII data associated with encrypted user tags and a set of double-encrypted PII data associated with encrypted bridge tags. The data partner 132 PII server 118b then compares the double-encrypted PII data to identify correlations between encrypted user tags and bridge tags. The data partner 132 PII server 118b returns the correlations the company 116 PII server 118a, which then decrypts the tag data and has the desired tag linkage data without anyone having revealed internal PII or PII mappings.

At operation 710, the data partner 132 PII server 118b generates an encryption key, X. In some implementations, the PII server 118b always uses the same key, X. In some implementations, the PII server 118b generates a new key, X, for each invocation of the process 700. The encryption key, X, is kept secret by the data partner 132 and may be discarded after completion of the process 700.

At operation 715, which may be before, after, or in parallel with operation 710, the PII server 118a on the company 116 side generates two unrelated encryption keys G and Z. The key G is for use in encrypting the user tags and bridge tags. In some implementations, the key G and the key Z are generated by the PII server 118a for different encryption algorithms. In some implementations, the encryption algorithm used for encrypting the user tags and bridge tags is non-commutative. The encryption keys, G and Z, are kept secret by the company 116 and one or both may be discarded after completion of the process 700.

At operation 718, the data partner 132 PII server 118b uses the encryption key, X, to encrypt each PII data element individually. The PII server 118b generates data pairs of a user's bridge tag and each PII data element associated with the user's bridge tag, each PII data element encrypted using the key, X. Accordingly, where the data partner 132 might map a bridge tag to an e-mail address and to a phone number, the PII server 118b encrypts the e-mail address to generate a first data pair of the bridge tag and the encrypted e-mail address, and the PII server 118b encrypts the phone number to generate a second data pair of the bridge tag and the encrypted phone number.

At operation 720, the data partner 132 PII server 118b sends the data pairs of {bridge tag, encrypted PII} to the company 116 PII server 118a. In some implementations, the data partner 132 PII server 118b sends the data via a data link to the company 116 PII server 118a, e.g., via TCP, SCTP, or any other OSI layer-4 transport protocol. In some implementations, the data link is a secured network link, e.g., using an additional layer of end-to-end encryption. In some implementations, the data partner 132 PII server 118b sends the data via a peer-to-peer link to the company 116 PII server 118a. At operation 725, the company 116 PII server 118a receives the data pairs from the data partner 132 PII server 118b.

An example of the data sent by the data partner 132 PII server 118b at operation 720 is a series of data pairs {BT1, E(X, PII1.1)}, {BT1, E(X, PII1.2)}, {BT2, E(X, PII2.1)}, and so forth. In this example, "BT1" and "BT2" are example bridge tags, each paired with an encrypted PII data element, PII1.1, PII1.2, PII2.1, etc. The company 116 PII server 118a would receive this data at operation 725 and then have possession of a set of bridge tags each paired with encrypted data. Accordingly, the PII data is obfuscated and protected. No personal information is shared.

At operation 733, the company 116 PII server 118a uses encryption keys to encrypt the partner data, using G to encrypt each bridge tag and Z to double-encrypt the already encrypted partner PII data. The result of this operation is that a received bridge tag and encrypted PII data element pair becomes an encrypted bridge tag and a double-encrypted PII data element pair: {BT, E(X, PII)} becomes {E(G, BT), E(Z, E(X, PII))}.

At operation 735, the company 116 PII server 118a sends the double-encrypted data pairs to the data partner 132 PII server 118b. In some implementations, the company 116 PII server 118a sends the data via a data link to the data partner 132 PII server 118b, e.g., via TCP, SCTP, or any other OSI layer-4 transport protocol. In some implementations, the data link is a secured network link, e.g., using an additional layer of end-to-end encryption. In some implementations, the company 116 PII server 118a sends the data via a peer-to-peer link to the data partner 132 PII server 118b. In some implementations, the company 116 PII server 118a sends the data using the same link used in operation 720. In some implementations, prior to (or while) sending the double-encrypted data pairs, the company 116 PII server 118a shuffles the order of the data pairs (keeping each pair intact). The shuffling causes a set of data pairs received by the company 116 PII server 118a at operation 725 in a first ordering to be re-ordered such that when the double-encrypted data pairs are returned to the data partner 132 PII server 118b at operation 735, they are returned in a second ordering that is different from the first ordering. This shuffling further obfuscates relationships between the encrypted data and the original sources of the data. The data partner 132 PII server 118b receives the encrypted (and in some implementations, shuffled) data at operation 738.

An example of the data sent by the company 116 PII server 118a at operation 735 is a series of data pairs, based on the previous example, double-encrypted and shuffled at operation 733. In this example, the encryption and shuffling results in the series {E(G, BT1), E(Z, E(X, PII1.1))}, {E(G,BT2), E(Z,E(X, PII2.1))}, {E(G, BT1), E(Z, E(X, PII1.2))}, and so forth. The data partner 132 PII server 118b would receive this data at operation 738 and then have possession of a set of encrypted bridge tags each paired with double-encrypted data. Accordingly, the PII data is still obfuscated and protected. No personal information is shared.

At operation 743, which may be before, after, or in parallel with operations 725, 733, and 735, the PII server 118a on the company 116 side uses the encryption keys G, Z to encrypt company 116 PII data. The PII server 118a encrypts internal user tags with the key G. In some implementations, the PII server 118a encrypts internal user tags with an alternative key G'. In some implementations, the PII server 118a generates a one-time mapping of internal user tags to random locally-unique values and substitutes the random values for the corresponding user tags (retaining the mapping for use in later reversing this process). The PII server 118a generates data pairs of the encrypted (or substitute) user tags with corresponding associated PII data elements. In each data pairing, the PII server 118a encrypts the PII data element using the key Z. In some implementations, the PII server 118a further generates false data pairs containing fake user tags and/or fake PII data elements. This additional false data helps obfuscate the real data and can confound unauthorized attempts to reverse the encryption process.

At operation 745, the company 116 PII server 118a sends the encrypted company data to the data partner 132 PII server 118b. In some implementations, the company 116 PII server 118a sends the data via a data link to the data partner 132 PII server 118b, e.g., via TCP, SCTP, or any other OSI layer-4 transport protocol. In some implementations, the data link is a secured network link, e.g., using an additional layer of end-to-end encryption. In some implementations, the company 116 PII server 118a sends the data via a peer-to-peer link to the data partner 132 PII server 118b. In some implementations, the company 116 PII server 118a sends the data using the same link used in operation 720 and/or operation 735. At operation 748, the data partner 132 PII server 118b receives the encrypted company data pairs from the company 116 PII server 118a.

An example of the data sent by the company 116 PII server 118a at operation 745 is a series of data pairs {E(G,UT1), E(Z, PII1.1)}, {E(G,UT3), E(Z, PII3.1)}, {E(G, UT5), E(Z, PII5.1)}, and so forth. In this example, "UT1," "UT3," and "UT5" are example user tags, each paired with an encrypted PII data element, PII1.1, PI13.1, PII5.1, etc. The data partner 132 PII server 118b would receive this data at operation 748 and then have possession of a set of encrypted user tags each paired with encrypted PII data. Accordingly, the PII data is protected. No personal information is shared.

At operation 756, the data partner 132 PII server 118b uses encryption key X to double-encrypt each PII data element individually in the data sent by the company 116 PII server 118a in operation 745. For example, in operation 748 the PII server 118b may have received a data pair for user tag "UT1" associated with PII data element "PII1.1," which the company 116 PII server 118a server encrypted as E(Z, PII1.1). The data pair may be represented as {E(G,UT1), E(Z, PII1.1)}. At operation 756, the data partner 132 PII server 118b uses encryption key X to double-encrypt the PII element, resulting in a data pair {E(G,UT1), E(X, E(Z, PII1.1))}.

In some implementations, rather than double-encrypting the data received at operation 748, the data partner 132 PII server 118b instead applies a decryption process to the double-encrypted data received at operation 738. In the decryption process, the data partner 132 PII server 118b uses the key X (or a decryption key corresponding to the key X) to remove the original encryption applied at operation 718. This decryption process does not remove the encryption applied by the company 116 PII server 118a at operation 733 and results in a single-encrypted value that is encrypted by the key Z. That is, Decrypt(X', Encrypt(Z, Encrypt(X, message)))=Encrypt(Z, message). Then, when the data partner 132 PII server 118b receives the single encrypted data at operation 748, the comparison at operation 760 may be conducted without operation 756. In some implementations, this alternative is invoked only if the set of data received at operation 748 is larger than the data sent at operation 720 by at least a threshold amount.

At operation 760, the data partner 132 PII server 118b compares the double-encrypted data sets from operations 738 and 756. Because the encryption algorithm used for encrypting PII is commutative, E(X, E(Z, PII1.1)) is equal to E(Z, E(X, PII1.1)). As a result, the data partner 132 PII server 118b can compare the E(X, E(Z, PII1.1)) value generated at operation 756 to values received at operation 738 and identify matches such as E(Z, E(X, PII1.1)). Because the comparisons at operation 760 are on encrypted data, no personal identifying data is revealed. Further, linkages between the different types of PII data are not revealed.

At operation 766, the data partner 132 PII server 118b identifies bridge linkages of associations between user tags and bridge tags. An association exists where an encrypted user tag and an encrypted bridge tag are both associated with the same double-encrypted PII data elements. In some implementations, at operation 766, the data partner 132 PII server 118b generates a map of encrypted user tags linked to encrypted bridge tags based on matched double-encrypted PII elements. In some implementations, there will be many correlations between encrypted user tags and encrypted bridge tags; in some such implementations, the data partner 132 PII server 118b filters out redundant correlations. In some implementations, multiple tags will correspond to the same PII. For example, multiple users may have the same address, same phone number, same city, same age bracket, etc. In some implementations, the data partner 132 PII server 118b identifies the strongest correlation between an encrypted user tag and an encrypted bridge tag, e.g., based on having a highest number of matched PII elements (compared to other tags). In some implementations, the data partner 132 PII server 118b filters out any associations leading to mapping more than one encrypted user tag to a particular encrypted bridge tag. In some implementations, the data partner 132 PII server 118b applies additional filters. In some implementations, provides the aggregate data to the company 116 PII server 118a for analysis; in some such implementations, the aggregate data is provided without the data partner 132 PII server 118b applying any filters.

At operation 760, the data partner 132 PII server 118b sends the bridge linkage data to the company 116 PII server 118a. In some implementations, the data partner 132 PII server 118b sends the data via a data link to the company 116 PII server 118a, e.g., via TCP, SCTP, or any other OSI layer-4 transport protocol. In some implementations, the data link is a secured network link, e.g., using an additional layer of end-to-end encryption. In some implementations, the data partner 132 PII server 118b sends the data via a peer-to-peer link to the company 116 PII server 118a. In some implementations, the company 116 PII server 118a sends the data using the same link used in operation 720. In some implementations, the data partner 132 PII server 118b transmits a map, generated at operation 765, to the company 116 PII server 118a. In some implementations, the data partner 132 PII server 118b sends linkage pairs as sets of encrypted user tags and encrypted bridge tags, e.g., {E(G, UT1), E(G, BT1)}.

At operation 775, the company 116 PII server 118a receives the data pairs from the data partner 132 PII server 118b. The company 116 PII server 118a can then decrypt the linkages using the key G (or a decryption key corresponding to the key G). The use of the third encryption key, G, improves the security of the data exchange and further protects the internal linkage data from being divulged.

In many implementations, data collected about a user may be anonymized or disambiguated to protect privacy. In many implementations in which personal information about the user of client device may be collected for measurement or used to select third-party content, the user may be provided with an opportunity to control whether programs or features that may collect personal information (e.g., information about a user's social network, social actions or activities, a user's preferences, or a user's current location) do so, or an opportunity to control whether or how to transmit measurement data to a PII server (e.g., PII server 118a, 118b). In addition, certain PII data may be treated in one or more ways before it is stored or used by a PII server or linking server, so that personally identifiable information is removed when generating parameters (e.g., demographic parameters). A user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by the PII servers and linking servers.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, including a programmable processor, a computer, a system on a chip, or multiple ones or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a System on a Chip (SOC), a field programmable gate array (FPGA), or an application specific integrated circuit (ASIC).

Processors suitable for the execution of a computer program include both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a cathode ray tube (CRT), liquid crystal display (LCD), organic light emitting diode (OLED), thin-film transistor (TFT), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending webpages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Communication networks can include various combinations of a local area network ("LAN"), a wide area network ("WAN"), an inter-network (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method for linking user identifiers, the method comprising:

receiving, by a linking server and from a company server, a first data structure comprising entries, each entry comprising an unhashed user tag, a first hashed user information, and a second hashed user information, each entry associated with a client device;

receiving, by a linking server and from a partner server, a second data structure comprising entries, each entry comprising an unhashed bridge tag, a first hashed bridge information, and a second hashed bridge information, each entry associated with a client device, wherein the first data structure is inaccessible to the partner server and the second data structure is inaccessible to the company server;

retrieving, by the linking server and from the first data structure, a first entry of the entries of the first data structure;

retrieving, by the linking server and from the second data structure, a first entry of the entries of the second data structure;

comparing, by the linking server, the first hashed user information of the first entry of the first data structure to the first hashed bridge information of the first entry of the second data structure;

linking, by the linking server and in response to determining a match, the unhashed user tag of the first entry of the first data structure to the unhashed bridge tag of the first entry of the second data structure to generate a first linkage that does not include the first hashed bridge information or the second hashed bridge information; and providing, by the linking server and to the company server, the first linkage.

2. The method of claim 1, wherein comparing comprises:

parsing, by the linking server, the first hashed user information of the first entry of the first data structure into a first set of characters;

parsing, by the linking server, the first hashed bridge information of the first entry of the second data structure into a second set of characters; and comparing, by the linking server, a character from the first set of characters to a character from the second set of characters.

3. The method of claim 1, further comprising providing, by the linking server and to the company server, the first linkage.

4. The method of claim 3, wherein the linking server exists inside a clean room environment and wherein the company server exists outside the clean room environment and wherein the partner server exists outside the clean room environment.

5. The method of claim 1, further comprising:

removing, by the linking server, the first entry of the first data structure and the first entry of the second data structure.

6. The method of claim 1, further comprising:

retrieving, by the linking server and from the first data structure, a second entry of the entries of the first data structure;

retrieving, by the linking server and from the second data structure, a second entry of the entries of the second data structure; and comparing, by the linking server, the first hashed user information of the second entry of the first data structure to the first hashed bridge information of the second entry of the second data structure.

7. The method of claim 6, further comprising:

determining, by the linking server, a mismatch between the first hashed user information of the second entry of the first data structure to the first hashed bridge information of the second entry of the second data structure; and comparing, by the linking server, the second hashed user information of the second entry of the first data structure to the second hashed bridge information of the second entry of the second data structure.

8. The method of claim 1, further comprising:

determining, by the linking server, a mismatch between the first hashed user information of the first entry of the first data structure to the first hashed bridge information of the first entry of the second data structure;

retrieving, by the linking server and from the second data structure, a second entry of the entries; and comparing, by the linking server, the first hashed user information of the first entry of the first data structure to the first hashed bridge information of the second entry of the second data structure.

9. The method of claim 8, further comprising:

comparing, by the linking server, the second hashed user information of the first entry of the first data structure to the second hashed bridge information of the second entry of the second data structure;

linking, by the linking server and in response to determining a match, the unhashed user tag of the first entry of the first data structure to the unhashed bridge tag of the first entry of the second data structure to generate a first linkage; and providing, by the linking server and to the company server, the first linkage.

10. A system for linking user identifiers, the system comprising a linking server having one or more processors and one or more storage devices storing instructions that, when executed by the one or more processors, cause the one or more processors to:

receive, from a company server, a first data structure comprising entries, each entry comprising an unhashed user tag, a first hashed user information, and a second hashed user information, each entry associated with a user of a client device;

receive, from a partner server, a second data structure comprising entries, each entry comprising an unhashed bridge tag, a first hashed bridge information, and a second hashed bridge information, each entry associated with a user of a client device, wherein the first data structure is inaccessible to the partner server and the second data structure is inaccessible to the company server;

retrieve, from the first data structure, a first entry of the entries of the first data structure;

retrieve, from the second data structure, a first entry of the entries of the second data structure;

compare, the first hashed user information of the first entry of the first data structure to the first hashed bridge information of the first entry of the second data structure; link, in response to determining a match, the unhashed user tag of the first entry of the first data structure to the unhashed bridge tag of the first entry of the second data structure to generate a first linkage that does not include the first hashed bridge information or the second hashed bridge information; and providing, to the company server, the first linkage.

11. The system of claim 10, wherein the one or more storage devices stores instructions that, when executed by the one or more processors, further cause the one or more processors to:

parse the first hashed user information of the first entry of the first data structure into a first set of characters;

parse the first hashed bridge information of the first entry of the second data structure into a second set of characters; and compare a character from the first set of characters to a character from the second set of characters.

12. The system of claim 10, wherein the one or more storage devices stores instructions that, when executed by the one or more processors, further cause the one or more processors to:

provide, to the company server, the first linkage.

13. The system of claim 12, wherein the linking server exists inside a clean room environment; wherein the company server exists outside the clean room environment; and wherein the partner server exists outside the clean room environment.

14. The system of claim 10, wherein the one or more storage devices stores instructions that, when executed by the one or more processors, further cause the one or more processors to:

remove the first entry of the first data structure and the first entry of the second data structure.

15. The system of claim 10, wherein the one or more storage devices stores instructions that, when executed by the one or more processors, further cause the one or more processors to:
retrieve, from the first data structure, a second entry of the entries;
retrieve, from the second data structure, a second entry of the entries; and
compare the first hashed user information of the second entry of the first data structure to the first hashed bridge information of the second entry of the second data structure.

16. The system of claim 15, wherein the one or more storage devices stores instructions that, when executed by the one or more processors, further cause the one or more processors to:
determine a mismatch between the first hashed user information of the second entry of the first data structure to the first hashed bridge information of the second entry of the second data structure; and
compare the second hashed user information of the second entry of the first data structure to the second hashed bridge information of the second entry of the second data structure.

17. The system of claim 10, wherein the one or more storage devices stores instructions that, when executed by the one or more processors, further cause the one or more processors to:
determine a mismatch between the first hashed user information of the first entry of the first data structure to the first hashed bridge information of the first entry of the second data structure;
retrieve, from the second data structure, a second entry of the entries of the second data structure; and
compare the first hashed user information of the first entry of the first data structure to the first hashed bridge information of the second entry of the second data structure.

18. The system of claim 17, wherein the one or more storage devices stores instructions that, when executed by the one or more processors, further cause the one or more processors to:
compare the second hashed user information of the first entry of the first data structure to the second hashed bridge information of the second entry of the second data structure;
link, in response to determining a match, the unhashed user tag of the first entry of the first data structure to the unhashed bridge tag of the first entry of the second data structure to generate a first linkage; and
provide, to the company server, the first linkage.

19. A method for linking user identifiers, the method comprising:
receiving, by a linking server and from a company server, a first data structure comprising entries, each entry comprising an unhashed user tag, a first hashed user information, and a second hashed user information, each entry associated with a user of a client device;
receiving, by a linking server and from a partner server, a second data structure comprising entries, each entry comprising an unhashed bridge tag, a first hashed bridge information, and a second hashed bridge information, each entry associated with a user of a client device, wherein the first data structure is inaccessible to the partner server and the second data structure is inaccessible to the company server;
generating, by the linking server, a third data structure based on the first hashed user information of a first entry of the first data structure and the hashed bridge information of a first entry of the second data structure, the third data structure comprising a linkage between the unhashed user tag of a first entry of the first data structure to the unhashed bridge tag of a first entry of the second data structure, the third data structure does not include the first hashed bridge information or the second hashed bridge information; and
providing, by the linking server and to the company server, the third data structure.

20. The method of claim 19, wherein the first data structure comprises a first email address associated with a client device and a first phone number associated with the client device and wherein the second data structure comprises a second email address associated with the client device and a second phone number associated with the client device.

* * * * *

UNITED STATES PATENT AND TRADEMARK OFFICE
CERTIFICATE OF CORRECTION

Page 1 of 1

PATENT NO.         : 10,558,817 B2
APPLICATION NO.    : 15/419726
DATED              : February 11, 2020
INVENTOR(S)        : Vinay Goel et al.

It is certified that error appears in the above-identified patent and that said Letters Patent is hereby corrected as shown below:

On the Title Page

Item (73), please delete "Foley & Lardner LLP" and insert --Google LLC--

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*